(12) United States Patent
Bartlett et al.

(10) Patent No.: US 6,494,266 B2
(45) Date of Patent: Dec. 17, 2002

(54) CONTROLS BRIDGE FOR FLOW COMPLETION SYSTEMS

(75) Inventors: Christopher D. Bartlett, Spring, TX (US); Christopher E. Cunningham, Spring, TX (US); Timothy R. Goggans, Cypress, TX (US); Jamie Patrick-Maxwell, Houston, TX (US); Sylvester A. Joan, Houston, TX (US); Stanley J. Rogala, Katy, TX (US)

(73) Assignee: FMC Technologies, Inc., Chicago, IL (US)

( * ) Notice: Subject to any disclaimer, the term of this patent is extended or adjusted under 35 U.S.C. 154(b) by 60 days.

(21) Appl. No.: 09/815,431

(22) Filed: Mar. 22, 2001

(65) Prior Publication Data

US 2001/0042624 A1 Nov. 22, 2001

Related U.S. Application Data

(60) Provisional application No. 60/192,124, filed on Mar. 24, 2000.

(51) Int. Cl.⁷ .................... E21B 33/038; E21B 33/076
(52) U.S. Cl. .................... 166/339; 166/65.1; 166/90.1; 166/344; 166/347; 166/348; 166/368
(58) Field of Search .................... 166/368, 348, 166/208, 86.1, 87.1, 88.1, 88.4, 89.2, 90.1, 65.1, 347, 344, 339, 365

(56) References Cited

U.S. PATENT DOCUMENTS

| | | | |
|---|---|---|---|
| 4,181,175 A | | 1/1980 | McGee et al. |
| 5,168,933 A | | 12/1992 | Pritchard, Jr. et al. |
| 5,544,707 A | * | 8/1996 | Hopper et al. ............. 166/368 |
| 5,558,532 A | * | 9/1996 | Hopper ..................... 439/201 |
| 5,918,676 A | | 7/1999 | Edwards |
| 5,941,574 A | | 8/1999 | Hamilton et al. |
| 5,971,077 A | | 10/1999 | Lilley |
| 6,076,605 A | * | 6/2000 | Lilley et al. ............... 166/344 |
| 6,082,460 A | | 7/2000 | June |
| 6,200,152 B1 | | 3/2001 | Hopper |
| 6,302,212 B1 | * | 10/2001 | Nobileau ................... 166/368 |
| 2002/0011336 A1 | * | 1/2002 | Baskett et al. ............. 166/368 |

FOREIGN PATENT DOCUMENTS

| | | |
|---|---|---|
| EP | 0 545 551 A2 | 6/1993 |
| EP | 0 637 675 A1 | 2/1995 |
| EP | 0 719 905 A1 | 7/1996 |
| EP | 0 854 267 A2 | 7/1998 |
| GB | 2 319 544 A | 5/1998 |
| GB | 2 319 795 A | 6/1998 |
| GB | 2 335 685 A | 9/1999 |
| WO | WO 00/47864 A1 | 8/2000 |

* cited by examiner

*Primary Examiner*—Hoang Dang
(74) *Attorney, Agent, or Firm*—Henry C. Query, Jr.

(57) ABSTRACT

A controls bridge for a flow completion system which comprises a tubing spool having a production outlet, a tubing hanger having a production bore that communicates with the production outlet and at least one service and control conduit extending therethrough, and at least one external service and control line that terminates near the tubing spool, the controls bridge comprising a first body portion; a mechanism for securing the first body portion to the top of the tubing spool and/or the tubing hanger; at least one first coupling member which is adapted to engage a second coupling member that is mounted in the service and control conduit; at least one third coupling member which is adapted to engage a fourth coupling member that is connected to the external service and control line; a bridge line which is connected between the first coupling member and the third coupling member; a first actuator for moving the first coupling member into engagement with the second coupling member; and a second actuator for moving the third coupling member into engagement with the fourth coupling member; wherein the first and second actuators are selectively operable to connect the service and control conduit to the external service and control line through the coupling members and the bridge line.

62 Claims, 31 Drawing Sheets

CONTROLS BRIDGE FOR FLOW COMPLETION SYSTEMS

This application is based on U.S. Provisional Patent Application No. 60/192,124, which was filed on Mar. 24, 2000.

BACKGROUND OF THE INVENTION

The present invention relates to a flow completion system for producing oil or gas from a hydrocarbon well. More particularly, the invention relates to a controls bridge for providing communication between the tubing hanger component of the system and a remote service and control vessel.

A typical horizontal-type flow completion system comprises a wellhead housing which is installed at the upper end of a well bore, a tubing spool or tree which is connected to the top of the wellhead housing, and a tubing hanger which is suspended in the tubing spool and which supports at least one tubing string that extends into the well bore. The tubing spool includes a production outlet through which the well fluids are produced, an annulus outlet through which the annulus surrounding the tubing string may be accessed, and a number of valves for controlling flow through the production and annulus outlets. In addition, the tubing spool typically supports a number of service valves, such as chemical injection valves, for controlling the flow of service fluids into the well bore. In the event of a failure of a service valve, this arrangement requires that the tubing spool be retrieved in order to repair or replace the valve. Retrieval of the tubing spool, however, requires that the completion consisting of the tubing hanger and tubing string first be pulled, which is a costly and time consuming procedure.

The tubing hanger may comprise a number of service and control conduits to facilitate the communication of control signals or fluids from a remote control station or an external subsea control module to valves or other devices located in or below the tubing hanger. The control signals or fluids are conveyed via external service and control lines which are connected to the remote control station through a controls umbilical or to the subsea control module, which is usually mounted on the tubing spool, through a length of fixed piping. Each service and control line is connected to a corresponding service and control conduit typically via a radial penetrator which extends laterally through the tubing spool and into the tubing hanger. However, existing radial penetrators are subject to mechanical failure, and each radial penetration represents a potential leak path in the tubing spool through which well fluids may escape into the environment.

SUMMARY OF THE INVENTION

These and other disadvantages in the prior art are overcome in the present invention by providing a controls bridge for a flow completion system that comprises a wellhead housing which is installed at the top of a well bore, a tubing spool which is connected above the wellhead housing, a tubing hanger which is supported in the tubing spool and from which is suspended at least one tubing string that extends into the well bore, and a plurality of service and control conduits that extend generally vertically through the top of the tubing hanger and communicate with corresponding devices located in or below the tubing hanger. The controls bridge comprises a body portion, a connector assembly for securing the body portion to the top of the tubing spool and/or the tubing hanger, at least one first coupling member which is adapted to engage a second coupling member that is mounted in a corresponding service and control conduit, at least one third coupling member which is adapted to engage a fourth coupling member that is connected to a corresponding external service and control line, a bridge line which is connected between the first coupling member and the third coupling member, and an actuating mechanism for moving both the first coupling member into engagement with the second coupling member and the third coupling member into engagement with the fourth coupling member to thereby connect the external service and control line with its corresponding service and control conduit in the tubing hanger.

Thus, the present invention allows each device which is located in or below the tubing hanger to be connected to its corresponding external service and control line through the top of the tubing hanger. Consequently, the traditional need to make these connections via radial penetrations between the tubing spool and the tubing hanger is eliminated, and the potential leak paths and mechanical complexity posed by such radial penetrations are avoided. In addition, since the controls bridge is preferably the sole interface between the external service and control lines and the corresponding devices located in and below the tubing hanger, the controls umbilical can be connected directly to the controls bridge, or to a junction plate which is mounted on the tubing spool and which in turn is connected to the controls bridge via a jumper. This arrangement eliminates the need for numerous individual connections between the controls umbilical and the tubing spool. Consequently, the cost and complexity of the overall flow completion system are reduced and the installation and operation of the system are simplified in comparison to prior art systems.

In one embodiment of the invention, the controls bridge may comprise one or more valves for controlling fluid flow through one or more bridge lines. Thus, for example, one of the external service and control lines may function as a chemical injection line and the controls bridge may comprise a chemical injection valve for controlling the flow of chemicals from the chemical injection line, through a corresponding service and control conduit in the tubing hanger and into the well bore. In this manner, the need for separate service valves mounted on the tubing spool may be eliminated. Moreover, if one of the service valves should malfunction, it may be repaired or replaced simply by retrieving the controls bridge, thereby eliminating the need to pull the completion and retrieve the tubing spool for this purpose.

Furthermore, the controls bridge of the present invention may facilitate communication with the annulus surrounding the tubing string. Thus, one of the external service and control lines may function as an annulus line which is connected via the controls bridge to a service and control conduit that communicates with the tubing annulus. The annulus line may, for example, communicate through an umbilical to a surface vessel or other remote location to allow for monitoring and/or venting of annulus pressure during production. In addition, another service and control line may function as a crossover line which is connected to both the tubing annulus and the production outlet to facilitate circulation of fluids between the tubing annulus and the production bore. Moreover, the controls bridge may also comprise one or more annulus closure members to control flow through the annulus lines and crossover lines. By positioning the annulus closure members in the controls bridge instead of on the tubing spool or in the tubing hanger, these components can be replaced or repaired simply by retrieving the controls bridge instead of having to pull the completion or retrieve the tubing spool.

The controls bridge is preferably a lightweight assembly that may be installed and retrieved using a remotely operated vehicle ("ROV") or an ROV in combination with a surface deployed cable. Alternatively, the controls bridge may be installed and retrieved using a remotely operated tool ("ROT"). Thus, if any of the components within the controls bridge requires servicing, the controls bridge can easily be retrieved without the need to disturb either the tubing spool or tubing hanger, and without the need for a large, expensive service vessel.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
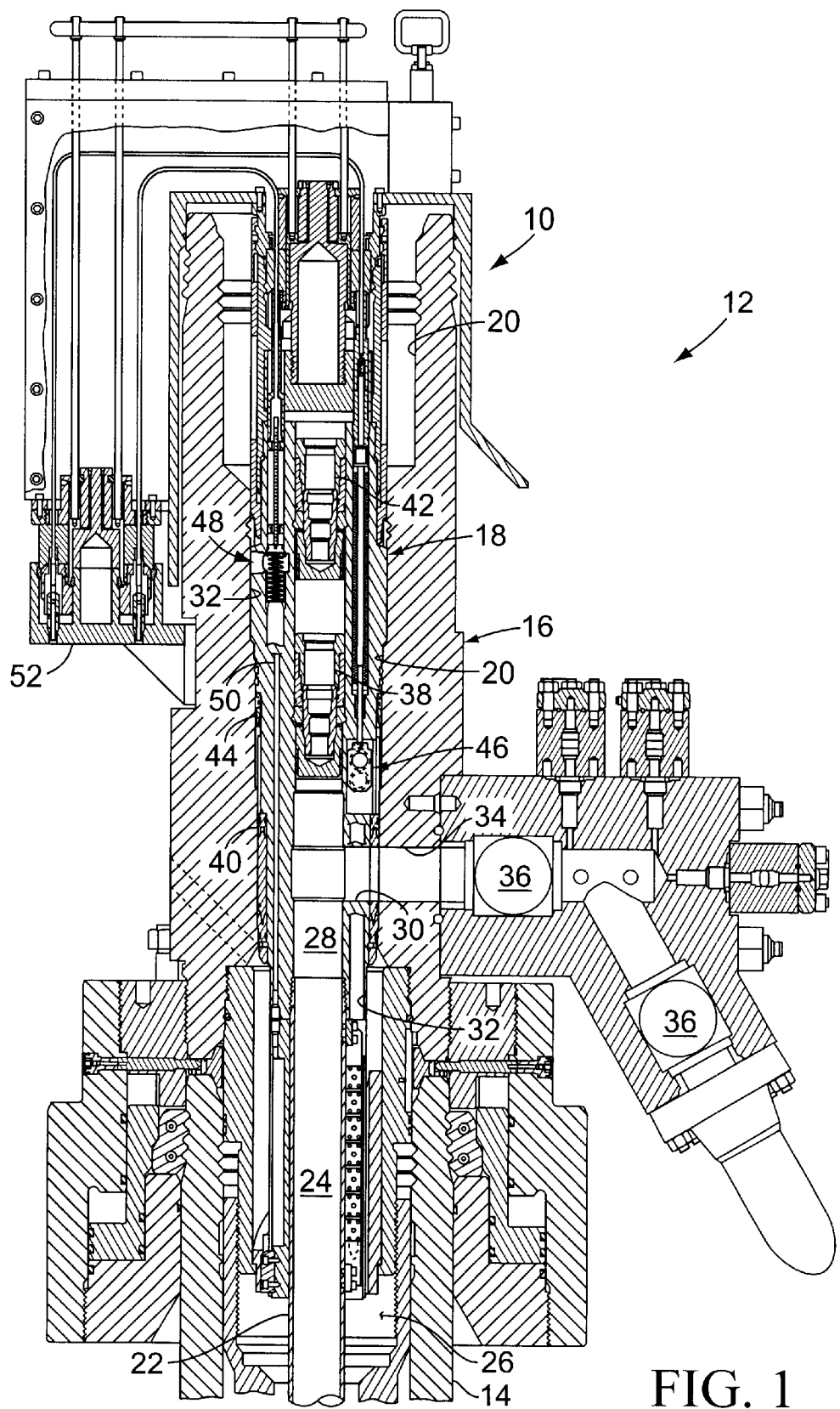
FIG. 1 is a diagrammatic representation of an exemplary flow completion system showing one embodiment of the controls bridge of the present invention installed thereon.

Referring to FIG. 1, one embodiment of a controls bridge 10 according to the present invention is shown installed on an exemplary flow completion system 12. As explained more fully in applicants' co-pending U.S. patent application Ser. No. 09/815,437 filed Mar. 22, 2001, which is hereby incorporated herein by reference, the flow completion system 12 comprises a wellhead housing 14 which is installed at the top of a well bore (not shown), a tubing spool 16 which is connected to the top of the wellhead housing 14, and a tubing hanger 18 which is landed in a central bore 20 that extends axially through the tubing spool 16. The tubing hanger 18 supports at least one tubing string 22 that extends into the well bore and defines a production bore 24 within the tubing string and a tubing annulus 26 surrounding the tubing string. In addition, the tubing hanger 18 includes a concentric production bore 28 which communicates with the tubing string production bore 24, a lateral production passageway 30 which extends between the production bore 28 and the outer diameter of the tubing hanger, and an annulus bore 32 which extends between the tubing annulus 26 and a portion of the central bore 20 located above the tubing hanger. Furthermore, the tubing spool 16 comprises a production outlet 34 which communicates with the production passageway 30, and the flow completion system 12 includes one or more valves 36 for controlling flow through the production outlet 34.

The tubing hanger 18 preferably supports both of the industry required first and second barriers between the well bore and the environment, thus eliminating the need for a separate pressure sealing tree cap. The first barrier is provided by a suitable first closure member 38, such as a wireline crown plug, which is disposed in the production bore 28 above the production passageway 30, and a first annular, preferably metal seal 40 which is positioned between the tubing hanger 18 and the tubing spool 16 above the production passageway 30. Similarly, the second barrier is provided by a suitable second closure member 42, such as a wireline crown plug, which is mounted in the production bore 28 above the first closure member 38, and a second annular, preferably metal seal 44 which is positioned between the tubing hanger and the tubing spool above the first seal 40. In addition, the annulus bore 32 is sealed by both a first closure member 46, such as a remotely operable gate valve, and a second closure member 48, such as a sting open check valve.

Figure 2:
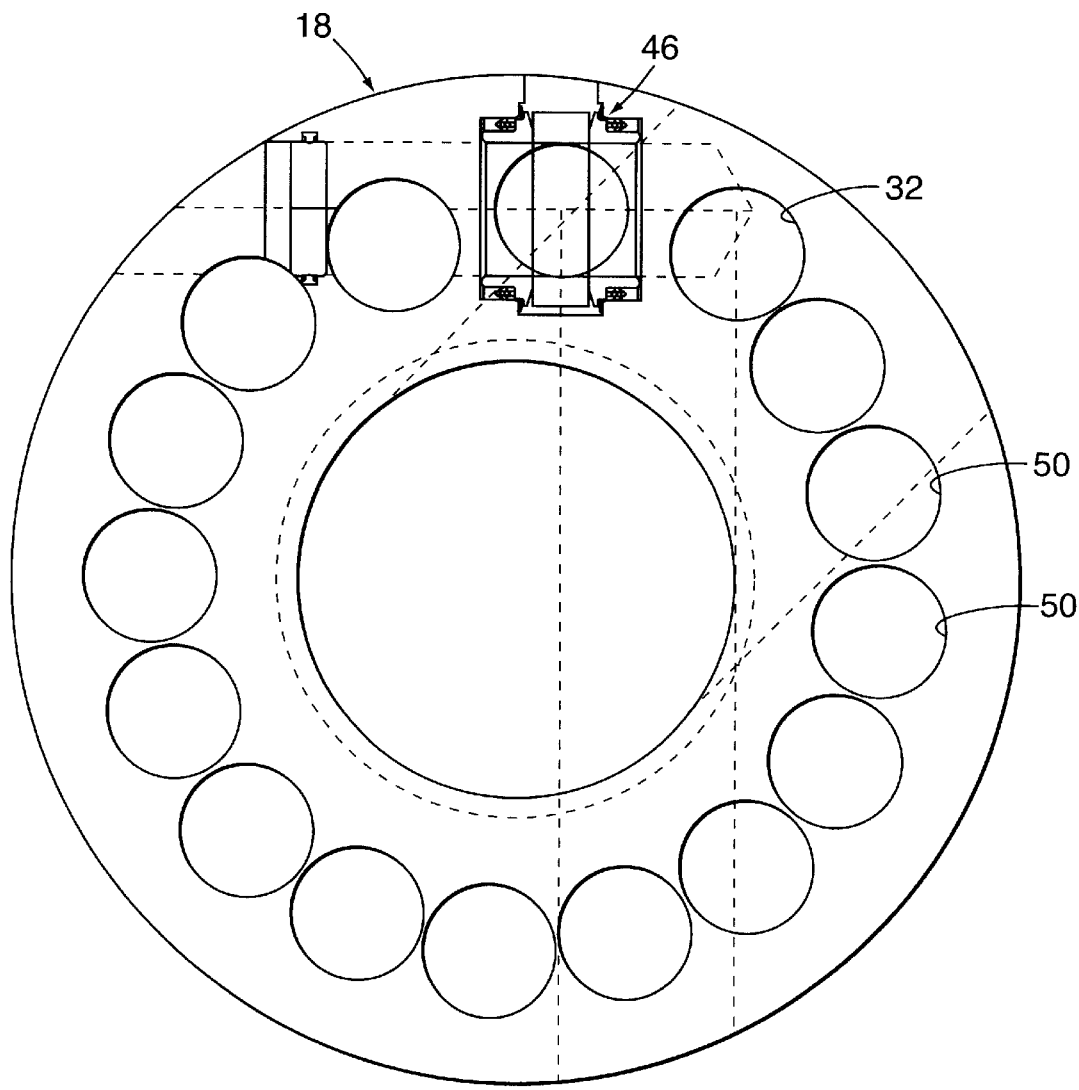
FIG. 2 is a top plan view of the tubing hanger component of the flow completion system depicted in FIG. 1.

In the embodiment of the flow completion system 12 depicted in FIG. 1, the tubing hanger 18 also comprises a number of service and control conduits 50. As shown in FIG. 2, the service and control conduits 50 are arranged radially around the central axis of the tubing hanger 18 and extend from the top of the tubing hanger generally vertically into or completely through the tubing hanger. The service and control conduits 50 provide for the communication of cables or fluids through the tubing hanger between corresponding external service and control lines (not shown) and devices or positions located in or below the tubing hanger. For example, one or more service and control conduits 50 may communicate hydraulic control fluid from a subsea control module to an operational device, such as a surface controlled subsea safety valve (not shown), which is located in the tubing string production bore 24. Also, one or more service and control conduits 50 may communicate pressure from the tubing annulus 26 to an external service and control line which is connected to a pressure monitoring device located, for instance, on a surface vessel. In this context, the annulus bore 32 may be considered a service and control conduit.

In accordance with the present invention, the controls bridge 10 functions to removably connect the external service and control lines (not shown) with their corresponding service and control conduits 50 through the top of the tubing hanger 18. In the embodiment of the invention depicted in FIG. 1, the flow completion system 12 preferably includes a junction plate 52 to facilitate the remote installation of the controls bridge 10. The terminal ends of the service and control lines are connected to the junction plate 52, which in turn is secured to the tubing spool 16 or other structure of the flow completion system 12. The service and control lines are typically grouped in an umbilical that originates at a remote control station located, for example, on a surface vessel or structure. While in the embodiment of the invention depicted in FIG. 1 the umbilical is connected directly to the junction plate 52, the umbilical may be connected, among other alternatives, directly to the controls bridge 10 or to a subsea control module which in turn is connected to the junction plate. When the controls bridge 10 is landed on the tubing spool 16 and operatively engaged with both the junction plate 52 and the tubing hanger 18, the service and control lines are connected with their respective service and control conduits 50 in the tubing hanger.

Figure 3:
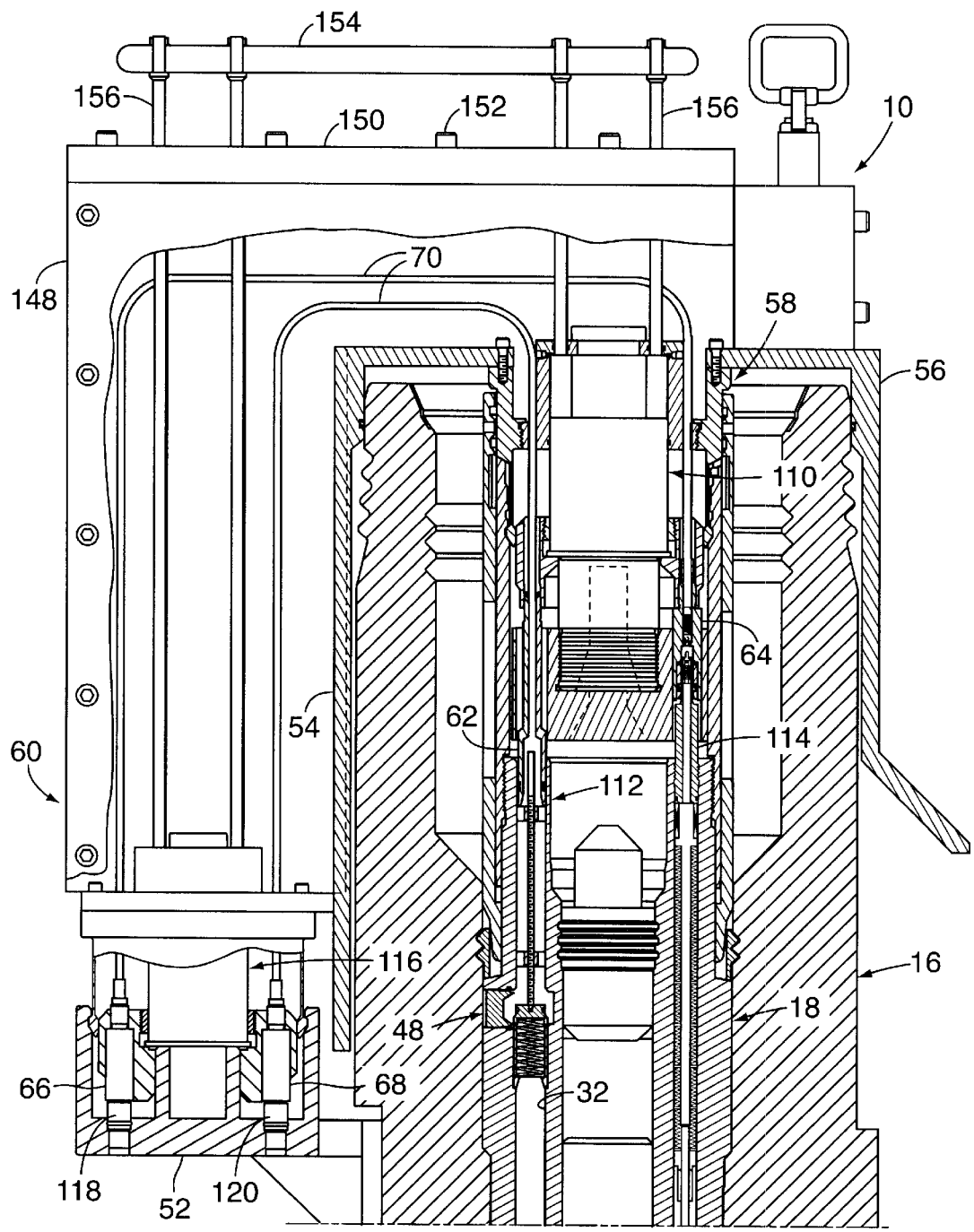
FIG. 3 is an enlarged sectional view of the controls bridge depicted in FIG. 1.

Referring to FIG. 3, the controls bridge 10 is shown to comprise a body portion 54 having a cap 56 which is configured to fit over the top of the tubing spool 16, a spool portion 58 which is supported by the body portion and which connects to the tubing hanger 18, and a junction portion 60 which is supported by the body portion and which connects to the junction plate 52. The spool portion 58 includes a number of first coupling members 62, 64 (only two of which are shown), the junction portion 60 includes a number of second coupling members 66, 68 (only two of which are shown), and the controls bridge 10 comprises a bridge line 70 extending between each of a number of pairs of corresponding first and second coupling members. The first and second coupling members may be, for example, any suitable hydraulic, electric, fluid or optical coupling members which are adapted to operationally engage corresponding coupling members connected to the tubing hanger and the external service and control lines, respectively. The bridge lines 70 may accordingly be any suitable hydraulic, electric, fluid or optical conduits or the like, depending on the type of coupling members to which they are connected.

Figure 4A:
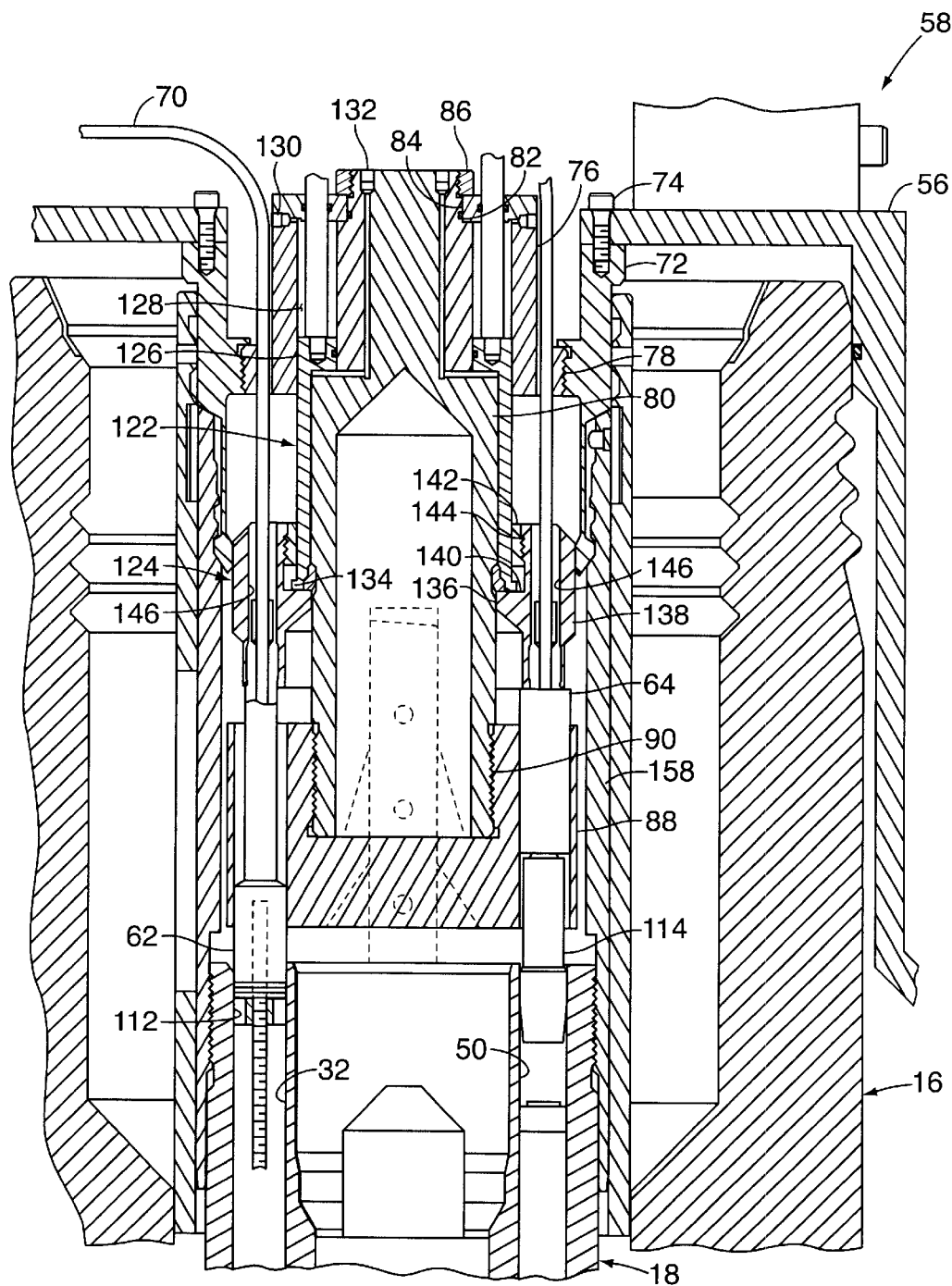
FIG. 4A is an enlarged view of the spool portion of the controls bridge shown in FIG. 3.

Referring to FIG. 4A, the spool portion 58 is shown to comprise a first support ring 72 which extends downwardly from the cap 56 and is connected thereto by suitable means, such as bolts 74, a first support sleeve 76 which is positioned within the first support ring 72 and is secured thereto such as by threads 78, a first guide cylinder 80 which has a reduced diameter upper portion 82 that is received in a central opening 84 in the top of the first support sleeve 76 and is secured therein by a nut 86, and a guide flange 88 which is connected to the lower portion of the first guide cylinder 80 by, for example, threads 90. Similarly, referring to FIG. 4B, the junction portion 60 is shown to comprise a support plate 92 which is preferably welded to the body portion 54 and extends generally laterally therefrom over the junction plate 52, a second support ring 94 which extends downwardly from the support plate 92 and is connected thereto by suitable means, such as bolts 96, a second support sleeve 98 which is positioned within the second support ring 94 and is secured thereto such as by threads 100, and a second guide cylinder 102 which has a reduced diameter upper portion 104 that is received in a central opening 106 in the top of the second support sleeve 98 and is secured therein by a nut 108.

In the embodiment of the invention shown in FIG. 3, the controls bridge 10 comprises a first actuating mechanism 110 for bringing the first coupling members 62, 64 into engagement with corresponding third coupling members 112, 114 mounted in the tubing hanger and a second actuating mechanism 116 for bringing the second coupling members 66, 68 into engagement with corresponding fourth coupling members 118, 120 mounted in the junction plate. Referring again to FIG. 4A, the first actuating mechanism 110, which is supported in the spool portion 58 of the controls bridge 10, comprises an actuating sleeve 122 that engages an actuating flange 124 to which the first coupling members 62, 64 are secured. The actuating sleeve 122 includes a preferably integral upper piston ring 126 which is disposed in a piston chamber 128 that is formed between the first support sleeve 76 and the first guide cylinder 80. Hydraulic control fluid is introduced into the piston chamber 128 above the piston ring 126 through one or more first inlets 130 to move the piston ring, and thus the actuating sleeve 122, downward. Similarly, hydraulic control fluid is introduced into the piston chamber 128 below the piston ring 126 through one or more second inlets 132 to move the piston ring, and thus the actuating sleeve 122, upward. The actuating sleeve 122 also includes a lower annular foot 134 which engages the actuating flange 124 to move it selectively up or down depending on the movement of the piston ring 126.

The actuating flange 124 comprises an axial bore 136 which has a diameter slightly larger than the outer diameter of the first guide cylinder 80, an outer annular rim portion 138, an annular support surface 140 which extends from the rim portion radially inwardly to the bore 136, a retainer nut 142 which is secured to the inner diameter of the rim portion above the support surface by threads 144, and a plurality of receptacles 146 which extend generally vertically through the rim portion and are disposed radially about the central axis of the actuating flange 124. The first coupling members 62, 64 are secured preferably by threads within the bottom of the receptacles 146, and one end of the bridge lines 70 extends through the top of the receptacles and attaches to the first coupling members in a known manner to provide for fluid communication therebetween.

In the exemplary embodiment of the controls bridge 10 depicted in FIG. 3, the first coupling member 62 is a stinger which engages the sting-open check valve 48 to open the annulus bore 32. Thus, in this example the third coupling member 112 is simply a sealing profile formed in the top of the annulus bore 32 into which the stinger 62 is sealably stabbed. When the controls bridge 10 is landed and locked on the tubing hanger 18 and the first actuating mechanism 110 is actuated, the stinger 62 will seal against the sealing profile 112 and maintain the check valve 48 in the open position. Therefore, provided the annulus bore 32 is open below the check valve 48, fluid communication may be established between the tubing annulus 26 and the bridge line 70 which is connected to the stinger 62.

Similarly, the first and third coupling members 64, 114 are shown to be the matching female and male components of a conventional hydraulic coupler. As is well understood in the art, the female and male components 64, 114 each comprise a poppet valve which is forced open when the female and male components are coupled together. Thus, when the controls bridge 10 is landed and locked on the tubing hanger 18 and the first actuating mechanism 110 is actuated, the female and male components 64, 114 will engage and the poppet valves within these components will open. Accordingly, fluid communication may be established between the service and control conduit 50 and the bridge line 70 which is connected to the female component 64.

The second actuating mechanism 116 is similar in construction to the first actuating mechanism 110. Therefore, a detailed description of its components is not necessary to an understanding of the present invention. Unless otherwise designated, in the description that follows the components of the second actuating mechanism 116 will be given the names and reference numbers of the similar components of the first actuating mechanism 110.

In the embodiment of the invention depicted in FIG. 3, the second coupling members 66, 68 are the female components of respective conventional hydraulic couplers, and the fourth coupling members 118, 120 are the matching male components of the couplers. Thus, when the controls bridge 10 is landed and locked on the junction plate 52 and the second actuating mechanism 116 is actuated to bring the second coupling members into engagement with the fourth coupling members, fluid communication may be established between the bridge lines 70 and the corresponding service and control lines which are connected to the fourth coupling members 118, 120.

Referring again to FIG. 3, the controls bridge 10 preferably also includes a housing 148 which extends between the spool portion 58 and the junction portion 60 and is secured to the body portion 54 by suitable means, such as welding. The housing 148 serves to provide structural integrity to the controls bridge 10 and to protect the bridge lines 70. The housing 148 may include one or more cover plates 150 which are preferably removably connected to the body portion 54 with bolts 152 so that the components of the controls bridge 10 may be easily accessed.

The installation of the controls bridge 10 will now be described with reference to FIGS. 5A–5D, in addition to FIGS. 3, 4A and 4B. The controls bridge is preferably sufficiently light to be installed using an ROV, but it may also be installed with a surface deployed cable or an ROT. To facilitate installation, the controls bridge 10 ideally includes a handle 154 which is connected to a number of pull rods 156, the distal ends of which are connected to the actuating sleeves 122 of the first and second actuating mechanisms 110, 116. Thus, when the handle 154 is lifted the rods 156 will pull the actuating sleeves upward into their home position, which correspond to the retracted position of the first and second coupling members 62, 64 and 66, 68. This will ensure that the coupling members are not extended and thus subject to being damaged during installation of the controls bridge 10. The handle 154 and rods 156 also comprise a mechanical override feature for this embodiment of the invention; that is, the first and second actuating mechanisms 110, 116 may be operated via the handle 154, for example, in the event of a hydraulic failure. It should be noted that, while a single handle 154 is shown attached to the rods 156 for both the first and second actuating mechanisms 110, 116, individual handles may be employed to mechanically operate the actuating mechanisms independently.

Figure 5A:
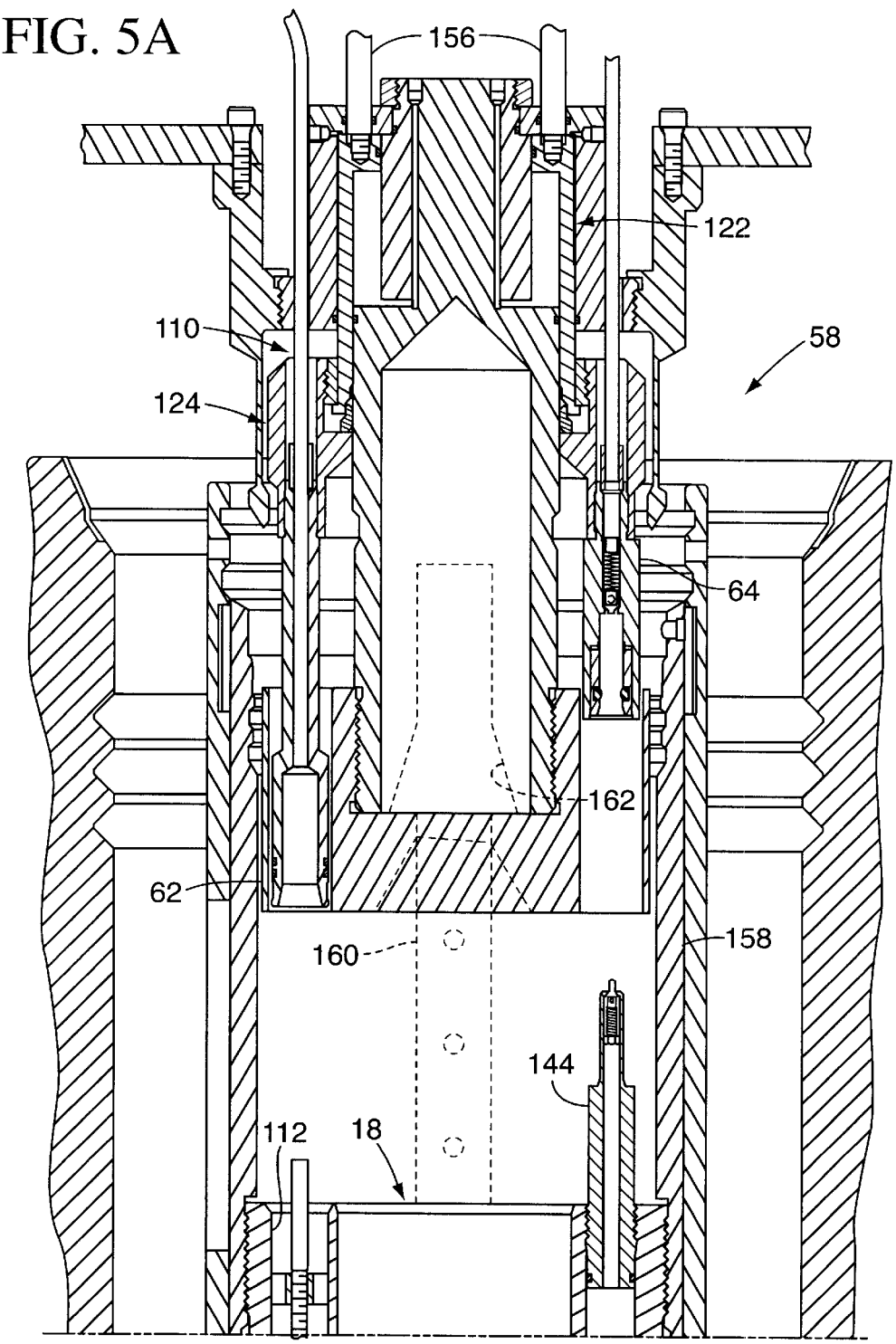
FIGS. 5A–5D are sequential views of the controls bridge of FIG. 3 being landed on, locked to and unlocked from a tubing hanger.

Prior to being installed, the controls bridge 10 is preferably parked on a fixture (not shown) attached to the tubing spool 16 or other structure of the flow completion system 12. The ROV will grasp the handle 154 and lift the controls bridge off of the fixture and over the top of tubing spool 16. The ROV will then roughly align the spool portion 58 with the tubing hanger 18 and the junction portion 60 with the junction plate 52. As illustrated in FIG. 5A, the ROV will then lower the controls bridge 10 so that the spool portion 58 enters into an annular upper extension portion 158 of the tubing hanger 18. The upper extension 158 preferably includes a key 160 which projects radially inwardly and engages a slot 162 formed on the outer diameter of the first guide cylinder 80 as the controls bridge 10 is lowered to align the spool portion 58 and the junction portion 60 with the tubing hanger 18 and the junction plate 52, respectively.

Figure 4B:
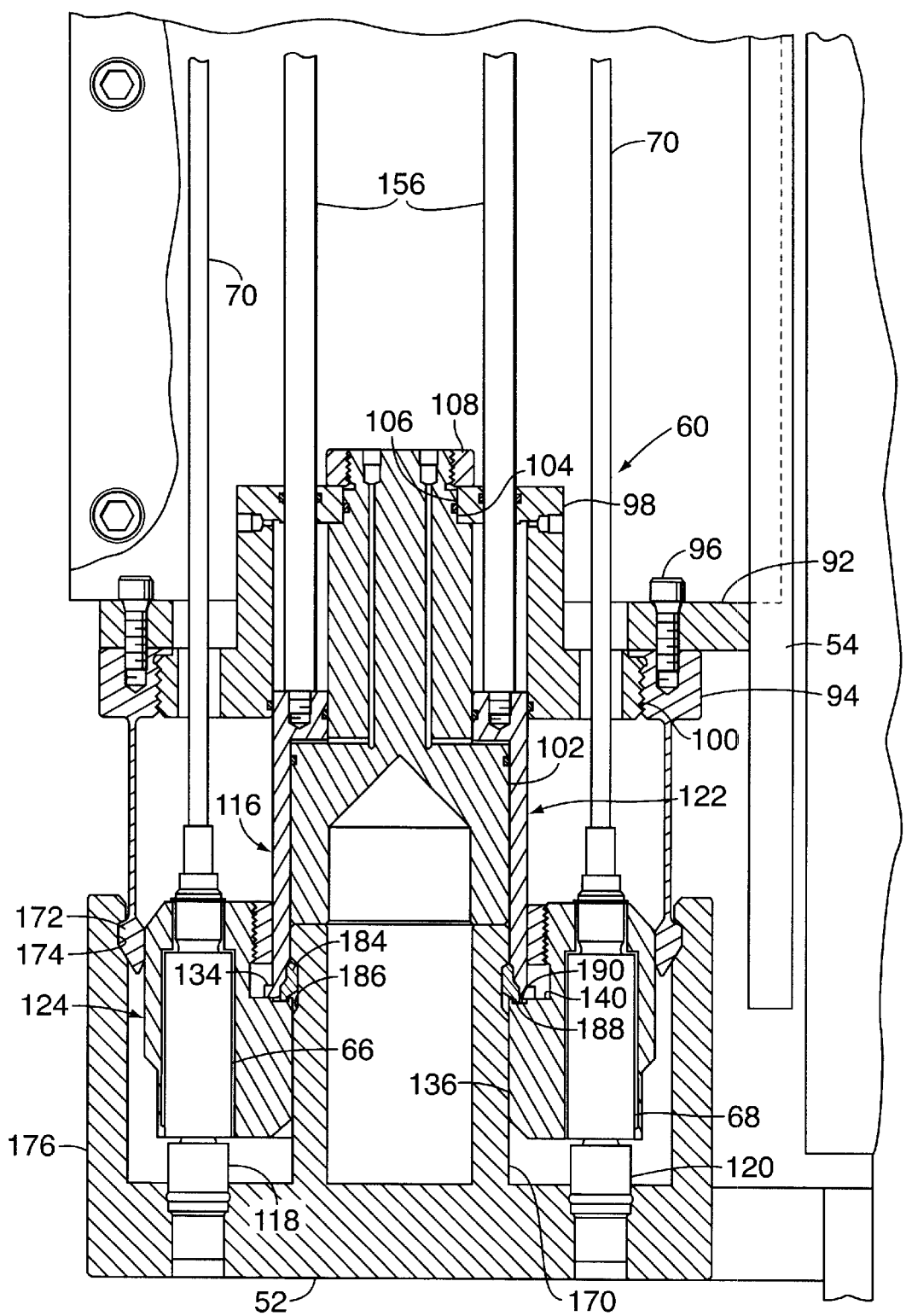
FIG. 4B is an enlarged view of the junction portion of the controls bridge shown in FIG. 3.
Figure 5B:
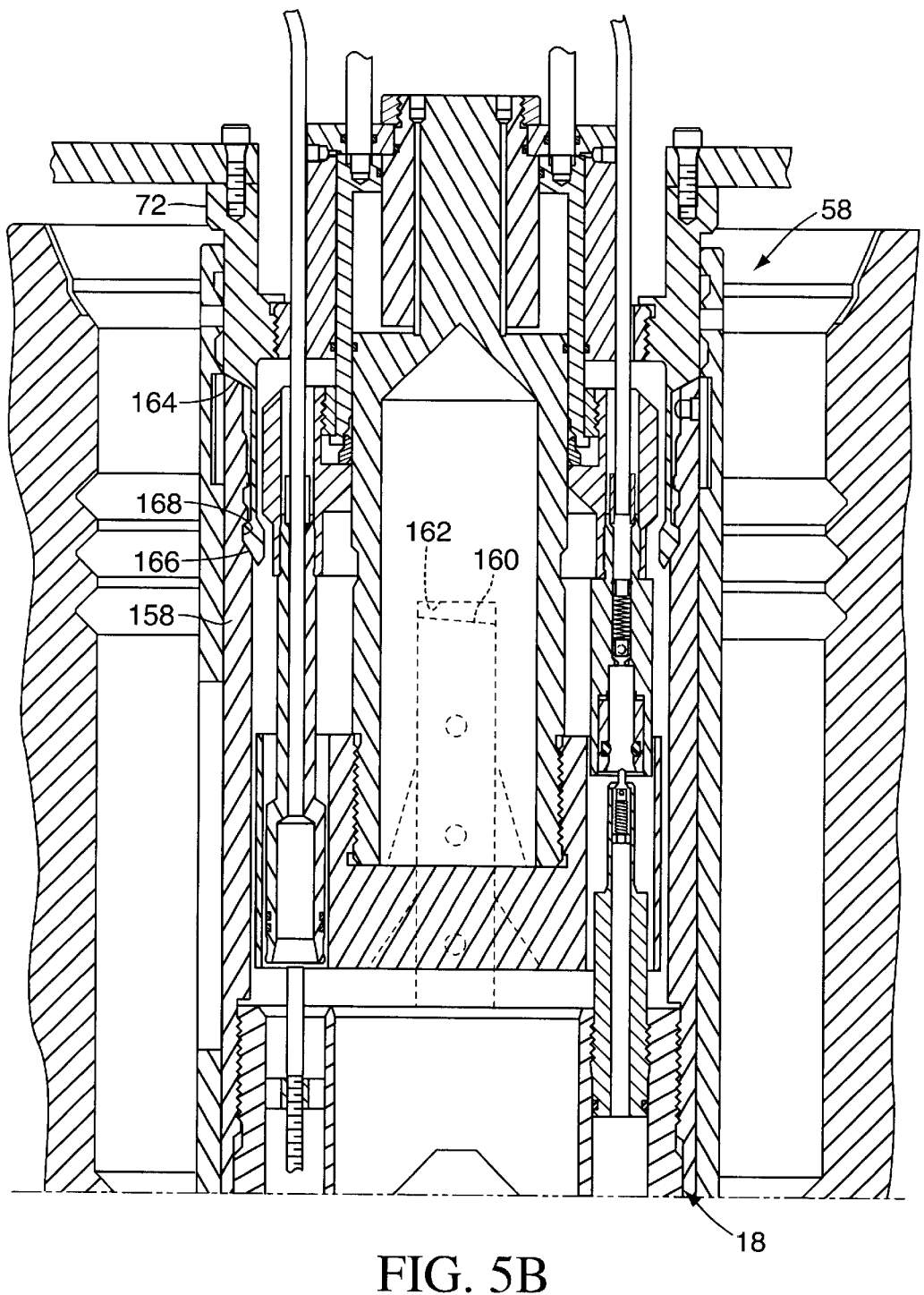

As shown in FIG. 5B, the first support ring 72 includes a downward facing shoulder 164 and a plurality of depending collet fingers 166. As the controls bridge 10 is lowered, the shoulder 164 will land on the top of the upper extension 158 and the collet fingers 166 will engage a groove 168 formed on the inner diameter surface of the upper extension. Similarly, as shown in FIG. 4B the bottom of the second guide cylinder 102 of the junction portion 60 will land on an upstanding boss 170 formed integrally with the junction plate 52, and a set of collet fingers 172 on the second support ring 94 will engage a corresponding groove 174 formed on the inner diameter surface of a cylindrical standard 176 which is also formed integrally with the junction plate 52.

Figure 5C:
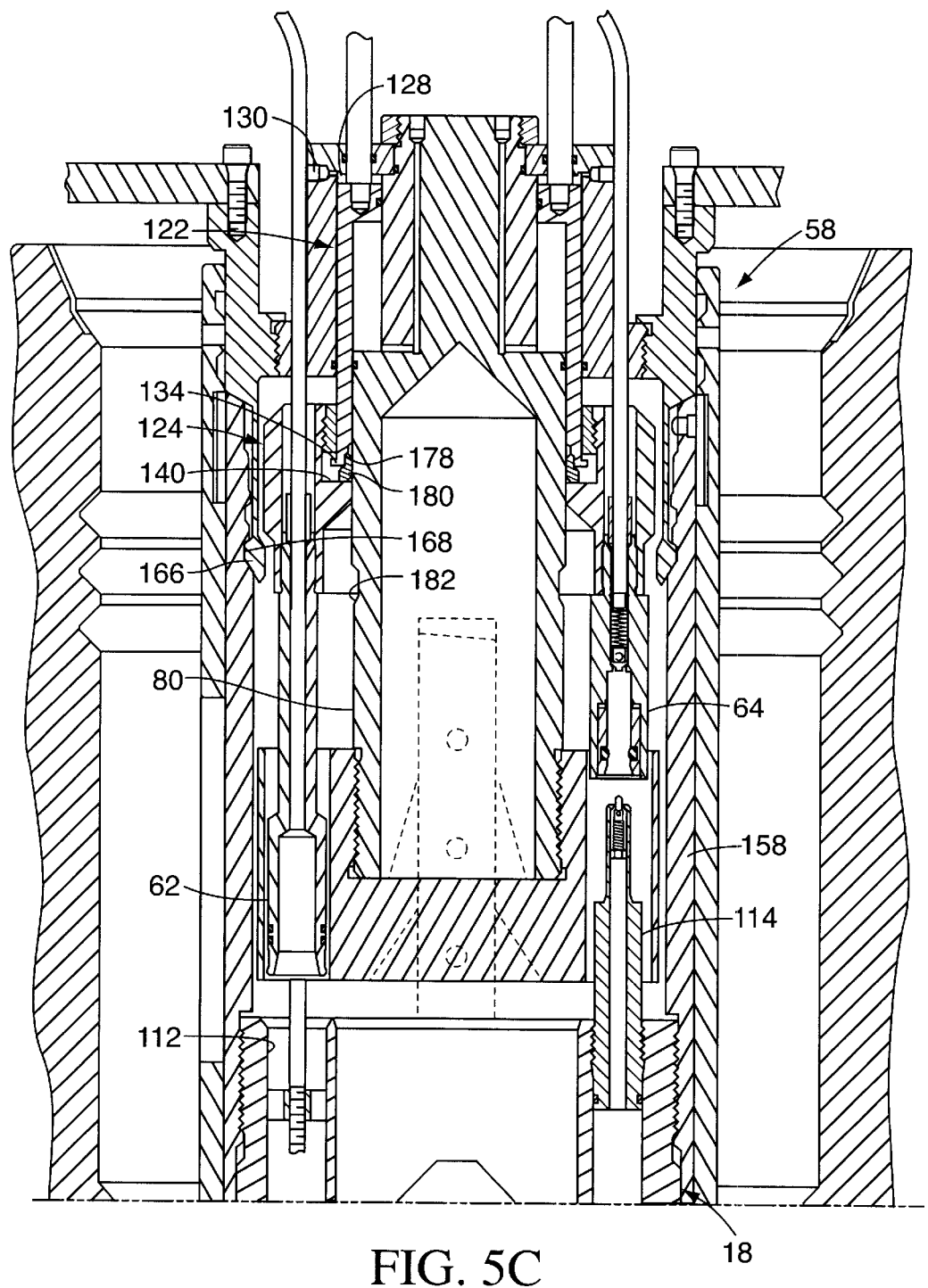

The first and second actuating mechanisms 110, 116 are now activated to bring the first and second coupling members into engagement with the third and fourth coupling members. Referring to FIG. 5C, hydraulic fluid is introduced into the piston chamber 128 through the first inlets 130 to force the actuating sleeve 122 downward. This will cause a downward facing heel 178 on the foot 134 to press down upon an inwardly-biased lock ring 180, which in turn will push down on the support surface 140 and move the actuating flange 124 downward. The foot 134, the lock ring 180 and the actuating flange 124 comprise a "lost motion device". As these components move downward together, the outer diameter surface of the actuating flange 124 will trap the collet fingers 166 in the groove 168 to securely lock the spool portion 58 of the controls bridge 10 to the tubing hanger 18. Further downward movement of the foot 134, the lock ring 180 and the actuating flange 124 will force the first coupling members 62, 64 into engagement with the third coupling members 112,114 in the tubing hanger 18, and this engagement force will react through the collet fingers 166 against the tubing hanger. Once the lock ring 180 is approximately opposite a lock groove 182 formed in the outer diameter surface of the first guide cylinder 80, the lock ring will spring into the lock groove. The foot 134 will then continue moving downward until it engages the support surface 140. In this position, which is shown in FIG. 4A, the first coupling members 62, 64 are fully extended into engagement with the third coupling members 112, 114, and the foot 134 will retain the lock ring 180 in the lock groove 182 to ensure that the coupling members maintain this engagement even under high pressure.

In a similar fashion, and with reference to FIG. 4B, upon activation of the second actuating mechanism 116 the foot 134 of the actuating sleeve 122 will push an inwardly biased lock ring 184 downward, which in turn will push the actuating flange 124 downward until the collet fingers 172 are trapped in the groove 174 to firmly lock the junction portion 60 into the junction plate 52. Further downward movement of the foot 134, the lock ring 184 and the actuating flange 124 will force the second coupling members 66, 68 into engagement with the fourth coupling members 118, 120 in the junction plate, and then push the lock ring into a corresponding lock groove 186 formed on the outer diameter surface of the boss 170. The foot 134 will then continue downward until it engages the support surface 140 of the actuating flange 124, at which point the second coupling members 66, 68 will be fully engaged with the fourth coupling members 118, 120 and the lock ring 184 will be retained in the lock groove 186 by the foot 134. It may be advantageous to provide the lock ring 184 with a depending rim 188 that is received in a retaining groove 190 formed in the support surface 140 adjacent the axial bore 136 of the actuating flange 124 to ensure that the lock ring is retained on the junction portion 60 prior to the junction portion being landed on the junction plate 52.

Figure 5D:
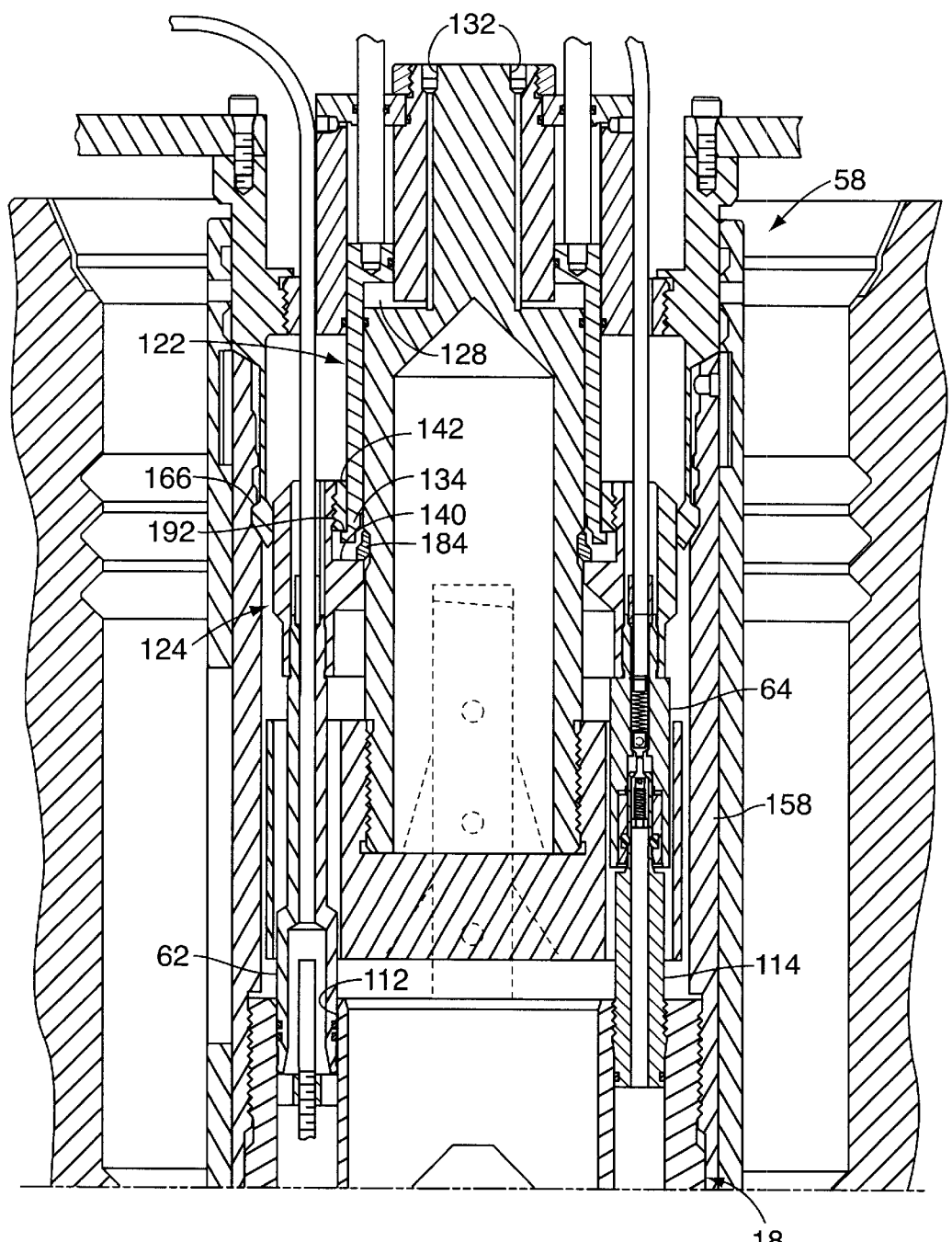

When it is desired to retrieve the controls bridge 10, the first and second actuating mechanisms 110, 116 are activated to disengage the first and second coupling members from the third and fourth coupling members. Referring to FIG. 5D, the spool portion 58 is disengaged from the tubing hanger 18 by introducing hydraulic fluid into the piston chamber 128 through the second inlets 132 to force the actuating sleeve 122 upward. As the foot 134 moves upward, a toe 192 on the foot will contact the bottom of the retainer nut 142 and pull the actuating flange 124 upward. This will cause the support surface 140 to push the lock ring 184 out of the lock groove 186. Further upward movement of the actuating sleeve 122 will pull the first coupling members 62, 64 out of engagement with the third coupling members 112, 114. Also, the outer diameter surface of the actuating flange 124 will move above the collet fingers 166 so that they are no longer trapped in the groove 168. The junction portion 60 is similarly disengaged from the junction plate 52. At this point, the controls bridge 10 may be lifted off the tubing hanger 18 and the junction plate 52.

Figure 6:
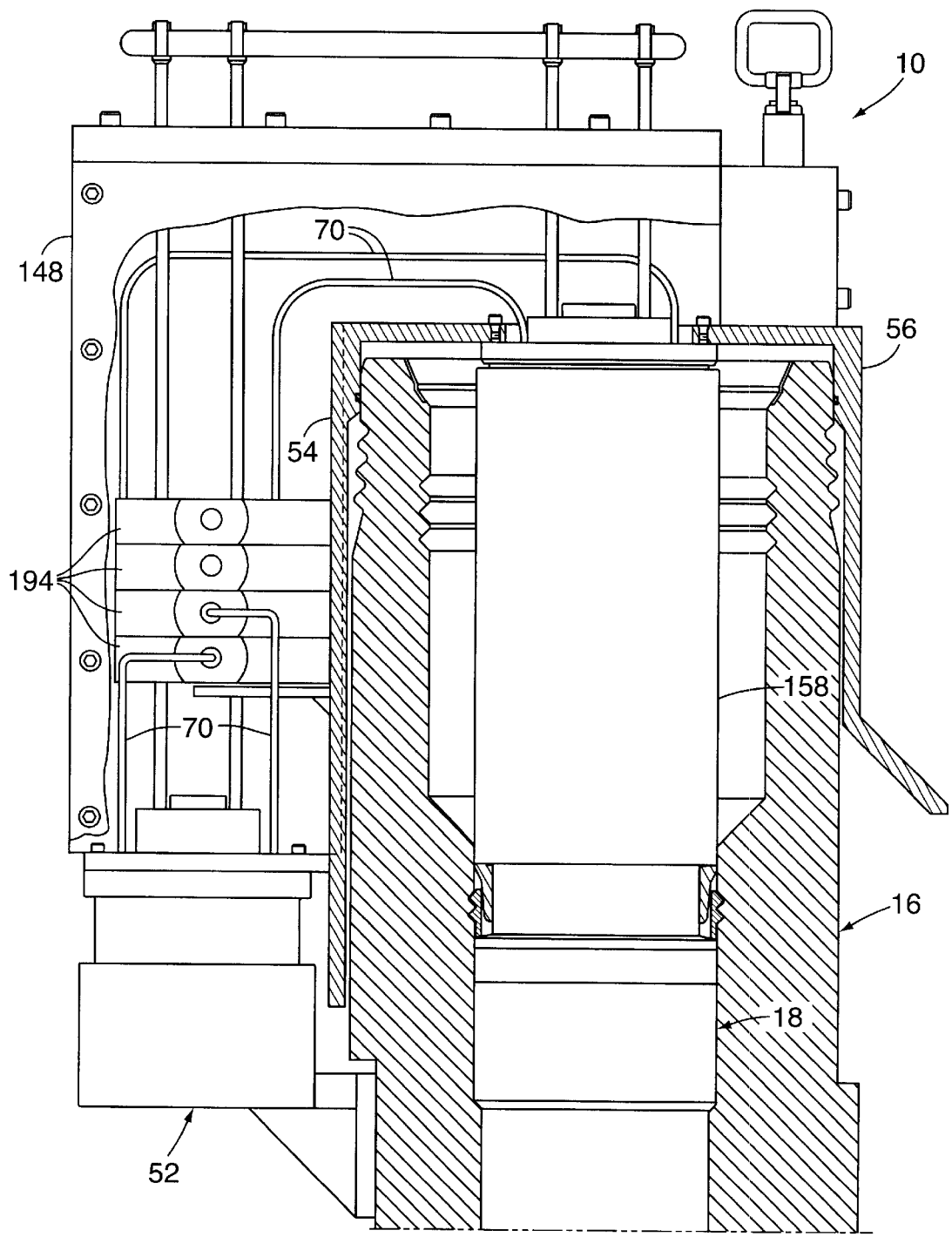
FIG. 6 is a sectional view of an alternative controls bridge having a plurality of closure members mounted therein.

In a variation of the controls bridge 10 shown in FIG. 6, the controls bridge may include one or more closure members 194 for controlling flow through the bridge lines 70. The closure members 194 may be either active or passive, and fail open, fail closed or fail as is, depending on the function of the service and control conduit 50 to which the closure member is connected. Any suitable closure member may be used for the closure members 194, including any of the closure members discussed herein. Furthermore, in the event a particular closure member 194 is an active closure member, hydraulic control lines would be connected between the closure member and a corresponding coupling member (not shown) mounted on the junction plate 52, which in turn would be connected to an external service and control line for the closure member. Alternatively, the controls bridge of the FIG. 6 embodiment of the present invention may include a subsea controls module having a hydraulic manifold and conventional actuators for controlling the operation of the closure members 194, in which event the hydraulic control lines would be connected to the controls pod actuators. All of the active closure members may be actuated simultaneously, in which event a single set of hydraulic control lines may be connected to all such closure members. Similarly, a gate valve assembly such as the multiport gate valve assembly disclosed in applicants' co-pending U.S. patent application Ser. No. 09/815,395 filed Mar. 22, 2001, which is hereby incorporated herein by reference, may be employed for a group of closure members which are intended to be actuated simultaneously. The closure members 194 may be mounted to the body portion 54 or the housing 148 of the controls bridge 10 by any appropriate means.

Figure 7:
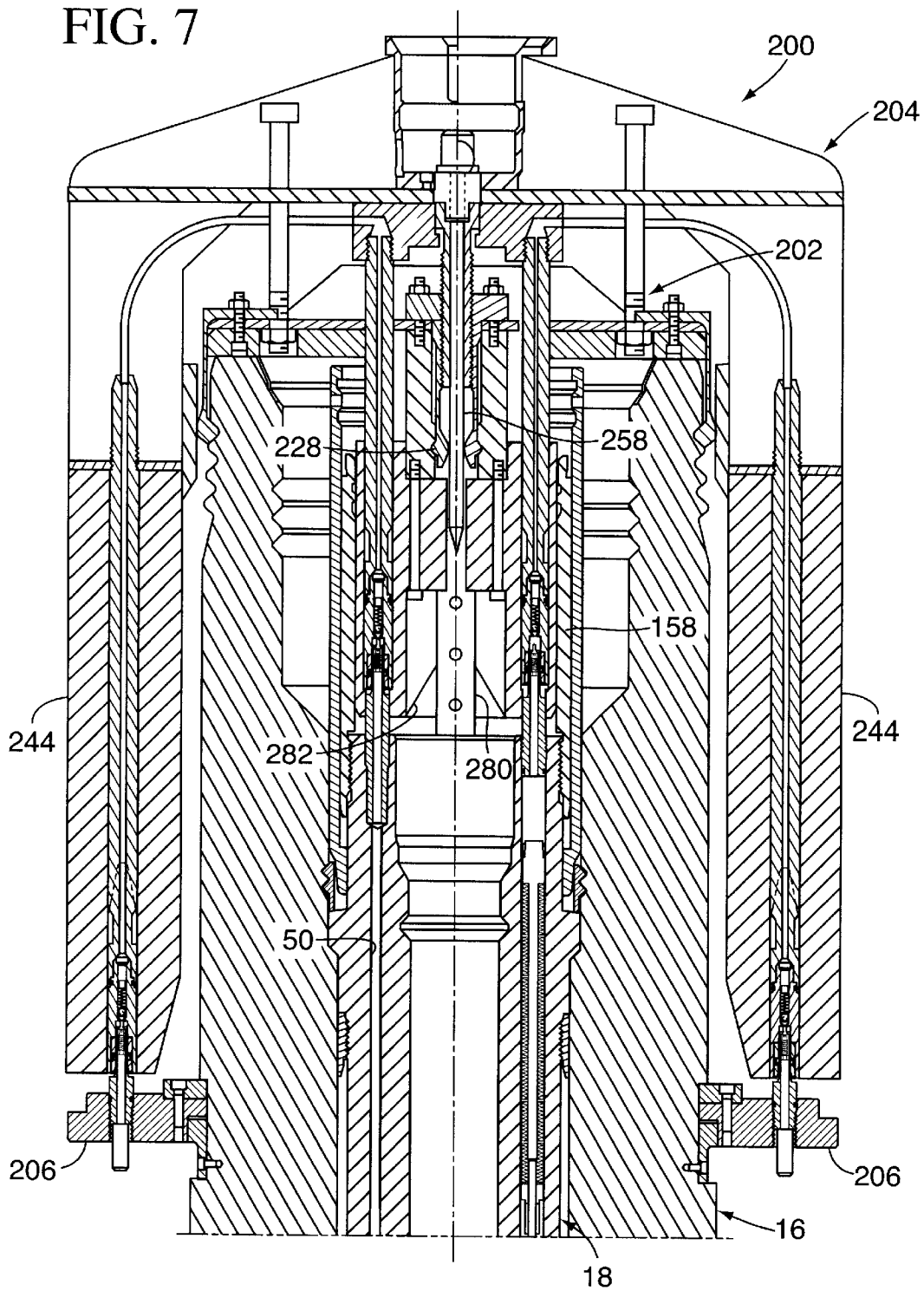
FIG. 7 is a sectional view of another embodiment of the controls bridge of the present invention.

An alternative embodiment of a controls bridge of the present invention is shown in FIG. 7. In this embodiment, the controls bridge, which is referred to generally by reference number 200, is shown to comprise a collet assembly 202, which is adapted to land on the spool tree 16, and a generally U-shaped bridge assembly 204, which is designed to connect to both the collet assembly 202 and preferably two junction plates 206 that are connected to opposite sides of the spool tree 16. As in the previous embodiments of the invention, the controls bridge 200 provides the means for connecting one or more service and control conduits 50 in the tubing hanger 18 with corresponding coupling members on the junction plates 206, which in turn are connected to external service and control lines (not shown).

Figure 9A:
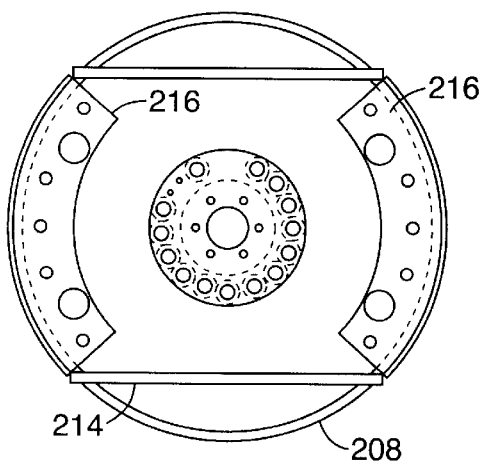
FIGS. 9A and 9B are top and exploded views, respectively, of the collet assembly depicted in FIG. 8.
Figure 9B:
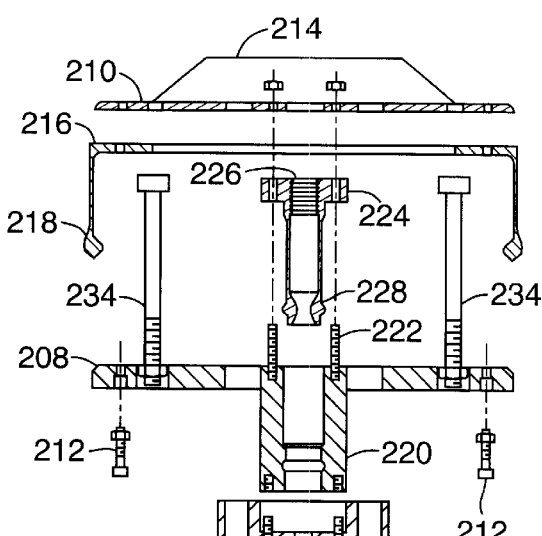
Figure 8:
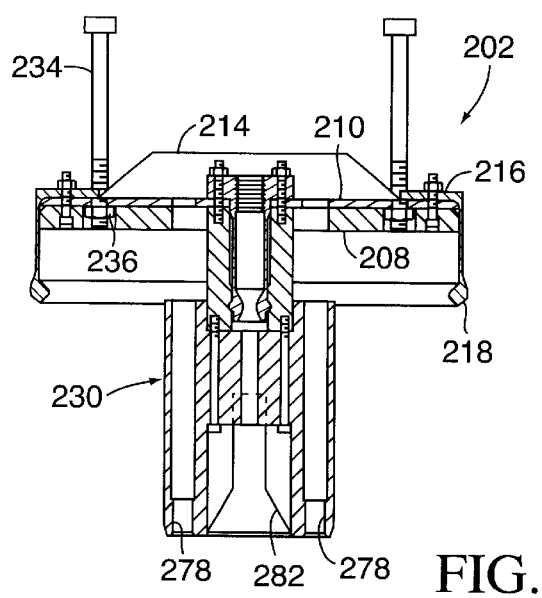
FIG. 8 is a sectional view of the collet assembly of the controls bridge depicted in FIG. 7.

Referring to FIGS. 8, 9A and 9B, the collet assembly 202 is shown to include a circular support plate 208 which comprises a first body portion of the controls bridge 200, a cover plate 210 which is secured to the top of the support plate by bolts 212 and which includes a partial cover 214, a locking sleeve 216 which is attached to the support plate 208 by the bolts 212 and which comprises a number of downwardly depending collet fingers 218, a support sleeve 220 which is connected to the cover plate 210 by bolts 222, a guide sleeve 224 which is secured to the cover plate 210 by the bolts 222 and which comprises a threaded inner diameter portion 226 and a plurality of guide fingers 228 that extend downwardly into the support sleeve 220, a guide cylinder 230 which is connected to the bottom of the support sleeve 220 by bolts 232, and a number of upstanding guide bolts 234 which are connected to the cover plate 210 by nuts 236.

Figure 11A:
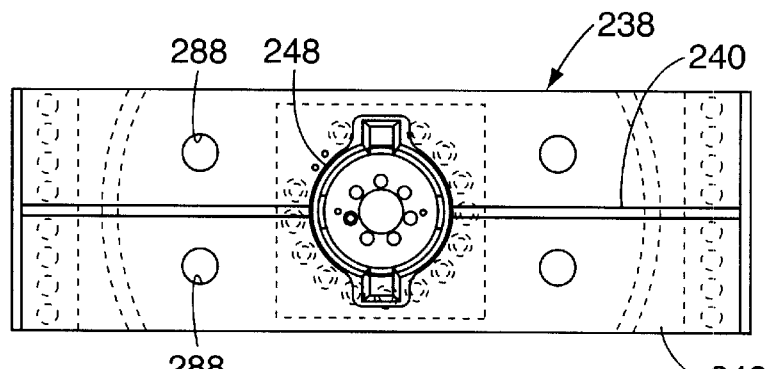
FIGS. 11A and 11B are top and exploded views, respectively, of the bridge assembly depicted in FIG. 10.
Figure 10:
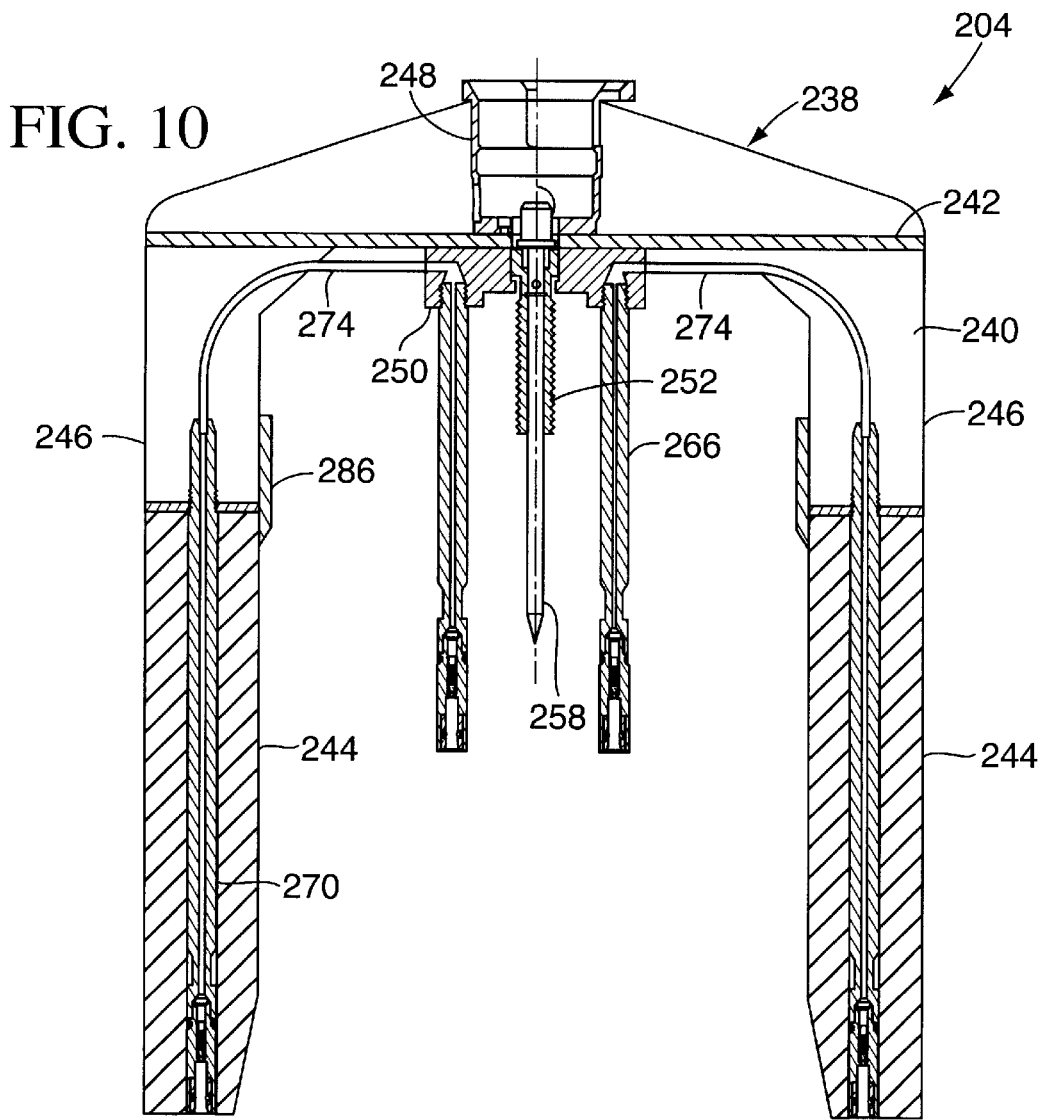
FIG. 10 is a sectional view of the bridge assembly of the controls bridge depicted in FIG. 7.
Figure 11B:
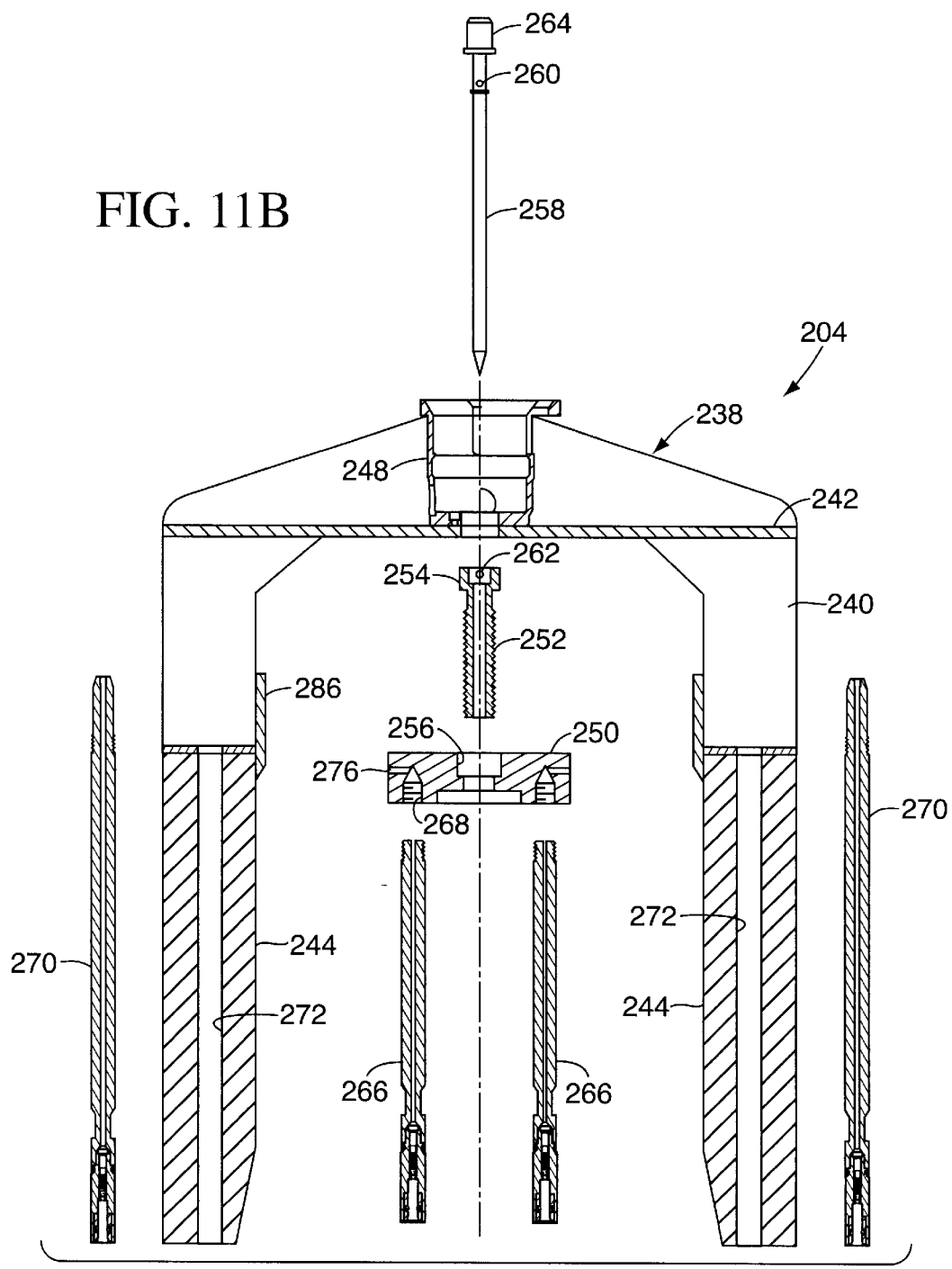

Referring to FIGS. 10, 11A and 11B, the bridge assembly 204 is shown to comprise a second body portion 238 of the controls bridge 200 which includes a vertically oriented, generally U-shaped frame plate 240 connected such as by welding to a transverse, generally rectangular platform 242. The bridge assembly also comprises preferably two coupling sleeves 244, each of which is connected to a respective lower branch 246 of the frame plate 240 such as by bolting or welding, a connection receptacle 248 which is connected to the centers of both the frame plate 240 and the platform 242 preferably by bolting or welding, an annular bushing 250 which is connected to the underside of the platform 242 by suitable means, a threaded sleeve 252 which includes an annular head 254 that is rotatably received within a receptacle 256 formed in the bushing 250, and an elongated shaft 258 which extends through the threaded sleeve 252 and is connected thereto by a pin (not shown) that extends through corresponding holes 260 and 262 in the shaft and the annular head of the threaded sleeve, respectively. The shaft comprises a head 264 which is adapted to be engaged for rotary motion by an ROV or an ROT. The bridge assembly 204 also includes a number of first coupling members 266 which are secured in respective apertures 268 formed in the bushing 250, a corresponding number of second coupling members 270 which are secured in respective vertical bores 272 extending through the coupling sleeves 244, and a corresponding number of bridge lines 274, each of which extends between a second coupling member 270 and a respective opening 276 in the bushing 250 that communicates with a corresponding first coupling member 266. In the embodiment of the invention depicted in FIGS. 7 and 10, the first and second coupling members are preferably the female components of conventional hydraulic couplers.

Referring again to FIG. 7, the collet assembly 202 and the bridge assembly 204 are unitized by lowering the bridge assembly onto the collet assembly until the first coupling members 266 are received in corresponding holes 278 extending vertically through the guide cylinder 230 and the threaded sleeve 252 is engaged by the threaded portion of the guide sleeve 224. The shaft 258 is then rotated to screw the threaded sleeve 252 into the guide sleeve 224 a predetermined distance. At this point, the shaft 258 is held firmly within the guide sleeve 224 by the guide fingers 228 but is allowed to rotate and translate axially with respect to the guide fingers.

Figure 12A:
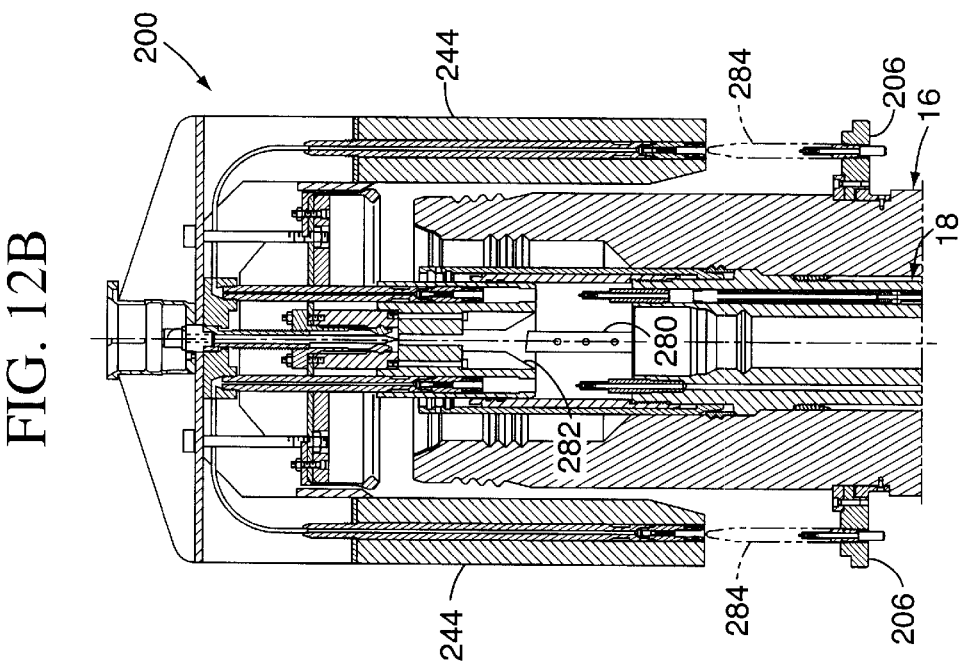
FIGS. 12A–12D are sequential views of the controls bridge of FIG. 7 being landed on and locked to a tubing spool.
Figure 12B:
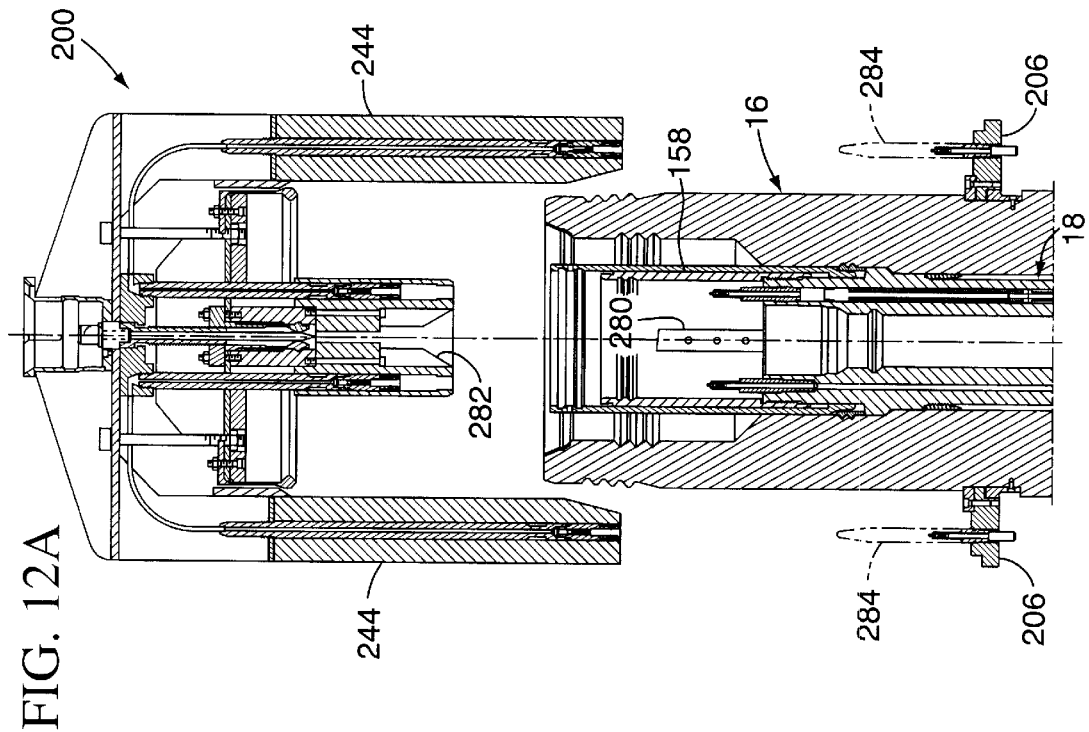
Figure 12D:
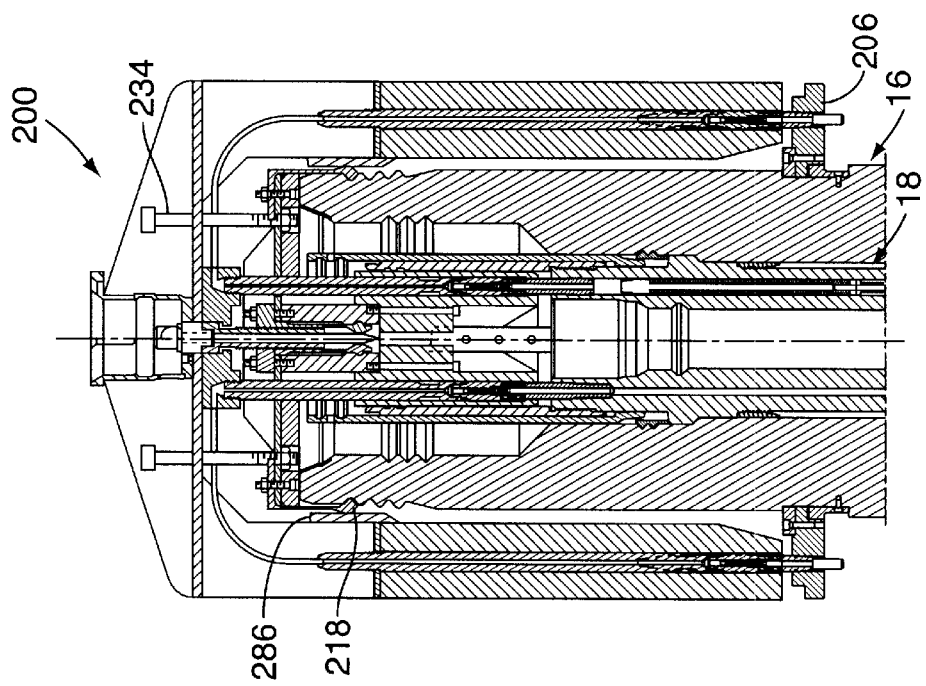
Figure 12C:
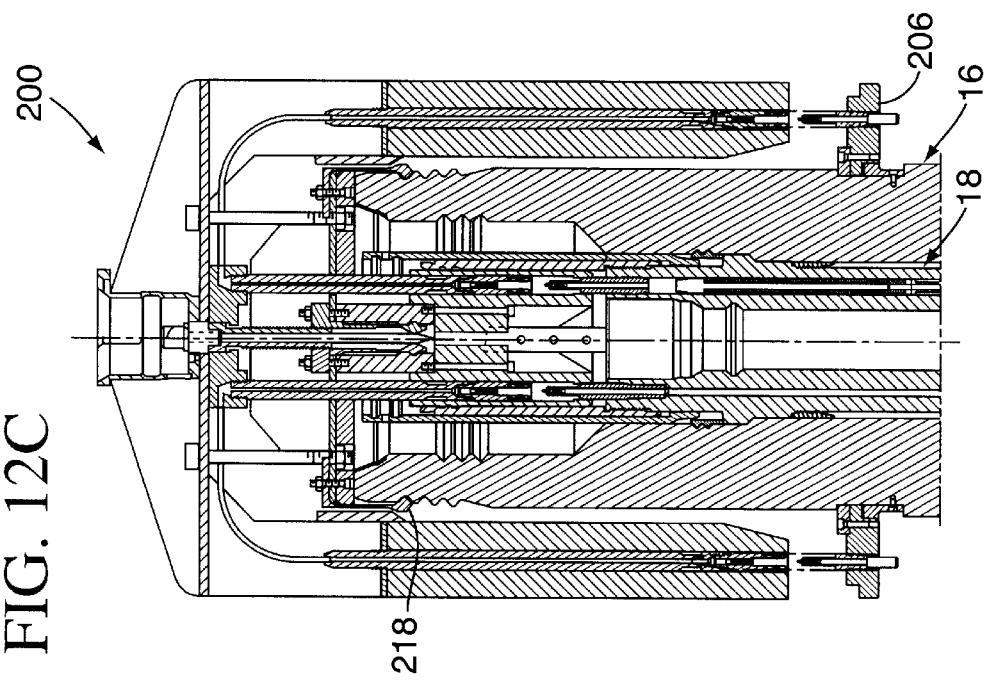

The installation of the controls bridge 200 will be discussed with reference to FIGS. 12A–12D, in addition to FIG. 7. The controls bridge 200 is preferably sufficiently light to be installed using an ROV, although it may also be installed using a surface deployed cable or an ROT. From its parked position, for example on fixture connected to the tubing spool 16 or other structure of the flow completion system 12, the controls bridge is lifted over the top of the tubing spool, roughly oriented with the coupling sleeves 244 positioned above the junction plates 206 (FIG. 12A), and then lowered onto the tubing spool 16 (FIG. 12B). At this point, a key 280 protruding radially inwardly from the upper extension 158 of the tubing hanger 18 engages a guide slot 282 formed on the outer diameter surface of the guide cylinder 230, and a vertical guide pin 284 connected to each junction plate 206 engages a corresponding guide hole in the coupling sleeve 244 (not shown), to precisely align the controls bridge 200 with both the tubing hanger 18 and the junction plates 206. Upon further lowering of the controls bridge 200, the support plate 208 will land on the top of the tubing spool 16 and the collet fingers 218 will engage a corresponding groove formed on the outer diameter wall of the tubing spool 16 (FIG. 12C).

The actuating mechanism of the controls bridge 200, which comprises certain of the components described above that will be discussed hereafter, is then actuated to lock the controls bridge to the tubing spool 16 and to engage the first and second coupling members 266, 270 with their corresponding coupling members on the tubing hanger and the junction plate. This is accomplished by rotating the shaft 258 to screw the threaded sleeve 252 into the guide sleeve 224, which in turn will pull the bridge assembly 204 downward and move a wedge ring 286 that is affixed to the second body portion 238 against the collet fingers 218 to trap the collet fingers in their groove and thereby securely lock the controls bridge 200 to the tubing spool 16, as shown in FIGS. 7 and 12D. Further rotation of the shaft 258 will lower the bridge assembly 204 and bring the first and second coupling members 266, 270 into engagement with their corresponding coupling members, which in this exemplary embodiment of the invention are the male components of the previously discussed hydraulic couplers. In this position, the tops of the guide bolts 234, which protrude through corresponding guide holes 288 formed in the platform 242 (see FIG. 11A), will extend above the platform to provide a visual indication that the first and second coupling members are engaged with their corresponding coupling members. In this manner, communication is established between the service and control conduits 50 in the tubing hanger 18 and the corresponding external service and control lines connected to the junction plates 206.

Another embodiment of a controls bridge of the present invention is illustrated in FIGS. 13–16. In this embodiment, the controls bridge, which is indicated generally by reference number 300, comprises two preferably separable components: a lower bridge component 302, which is shown separately in FIGS. 13 and 14, and an upper bridge component 304, which is shown separately in FIGS. 15 and 16. The lower bridge component 302 lands and locks on the tubing hanger 18, while the upper bridge component 304 lands and locks on the lower bridge component 302. In addition, the lower bridge component 302 provides a means for connecting one or more service and control conduits 50 in the tubing hanger 18 with corresponding coupling members located in the lower bridge component, and the upper bridge component 304 provides a means for connecting the coupling members in the lower bridge component with corresponding external service and control lines (not shown). Thus, together the lower and upper bridge components connect the service and control conduits 50 with the external service and control lines.

Furthermore, the lower bridge component 302 may include one or more closure members to control flow through each of a number of the service and control conduits 50 in the tubing hanger 18. In this manner, the upper bridge component 304 may be retrieved independently for maintenance while the lower bridge component 302 remains in place to provide the necessary barrier between the well bore and the environment through the service and control conduits 50. Consequently, independent barriers are not required in the tubing hanger 18 to isolate the service and control conduits 50 from the environment, and this greatly reduces the cost and complexity of the tubing hanger. Alternatively, if such barriers do exist in the tubing hanger 18, or if under certain circumstances such barriers are not required for the safe removal of the unitized controls bridge 300, the upper and lower bridge components may be retrieved together.

Figure 14:
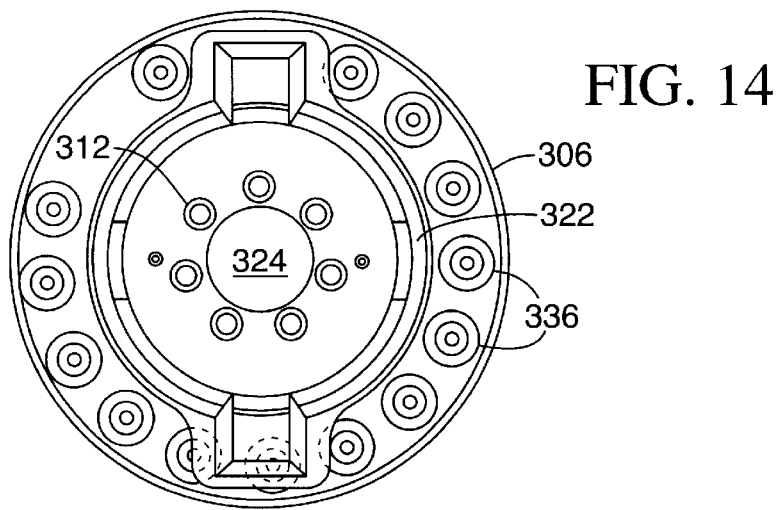
FIG. 14 is a top view of the lower bridge component depicted in FIG. 13.
Figure 13:
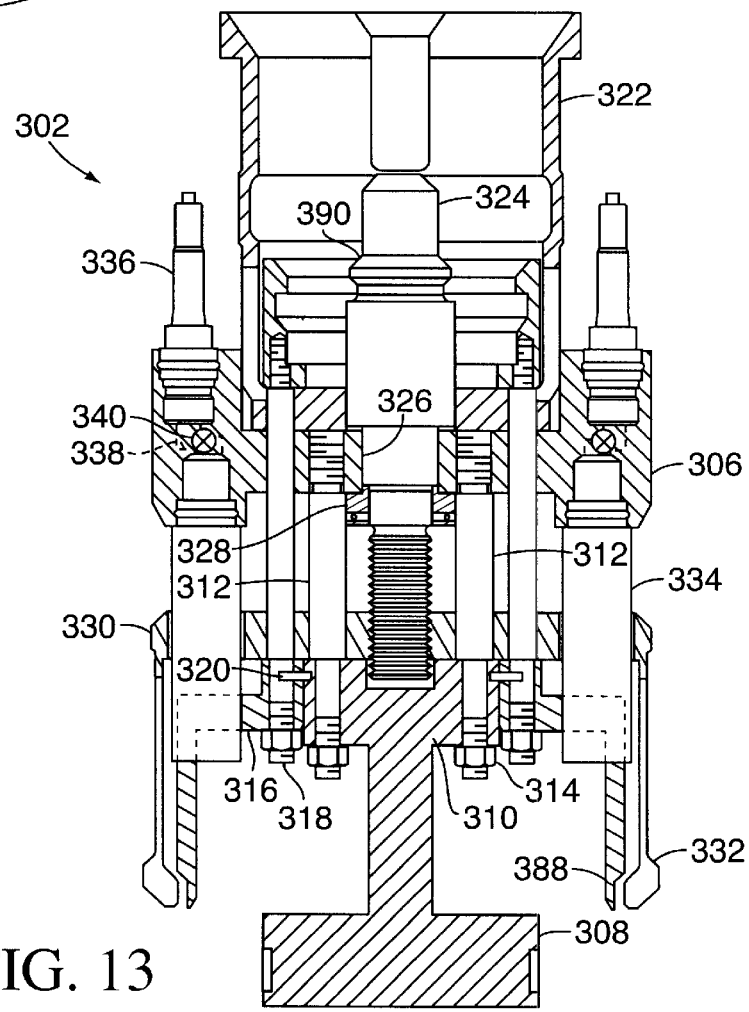
FIG. 13 is a sectional view of the lower bridge component of yet another embodiment of the controls bridge of the present invention.

Referring to FIGS. 13 and 14, the lower bridge component 302 is shown to comprise an annular first body portion 306, an I-shaped bore plug 308 which includes a base 310 that is spaced from the body 306 by a number of standoffs 312 and is connected thereto by suitable means, such as bolts 314, a locking sleeve 316 which surrounds the base 310 and is connected to the body 306 by bolts 318, a number of pins 320 or other suitable means for aligning the locking sleeve 316 vertically relative to the base 310, a cylindrical receptacle 322 which is connected to the top of the body 306 such as by bolts (not shown), a shaft 324 which extends through both the receptacle 322 and an axial hole 326 in the body 306 and is rotatably connected to the body by, for example, a shaft collar 328, and a collet sleeve 330 which is threadedly connected to the shaft 324 below the body 306 and which includes a plurality of downwardly depending collet fingers 332. The lower bridge component 302 also includes a number of first coupling members 334 which are secured in respective receptacles in the bottom of the body 306, and a corresponding number of second coupling members 336 which are secured in respective receptacles in the top of the body 306. The first coupling members 334 may be, for example, the female components of conventional hydraulic couplings, and the second coupling members 336 may be, for example, the male components of similar conventional hydraulic couplings.

In accordance with a preferred embodiment of the invention, the lower bridge component 302 also comprises a bridge line or internal passageway 338 extending between each pair of corresponding first and second coupling members 334, 336. In addition, the lower bridge component preferably includes at least one closure member 340 for controlling flow through each of one or more passageways 338. The closure members 340 may be either active or passive, and fail open, fail closed or fail as is, depending on the function of the service and control conduit 50 to which the passageway 338 is connected. Any suitable closure member may be used for the closure members 340, including any of the closure members discussed herein.

As an alternative to the use of the combination of the second coupling members 336 and the closure members 340, the second coupling members could be replaced with a fluid coupling comprising a combination poppet and gate valve, such as is disclosed in applicants' co-pending U.S. patent application Ser. No. 09/844,579 filed Apr. 26, 2001, which is hereby incorporated herein by reference. As described in therein, this combination fluid coupling includes both a conventional poppet-type valve and a gate valve which is opened upon actuation of the poppet valve stem. Therefore, the combination fluid coupling provides two pressure-containing barriers in a single flow control component. It should be understood that such a combination fluid coupling could also be substituted for certain of the other components described herein, such as the male couplings that are installed in the service and control conduits in the tubing hanger.

Figure 16:
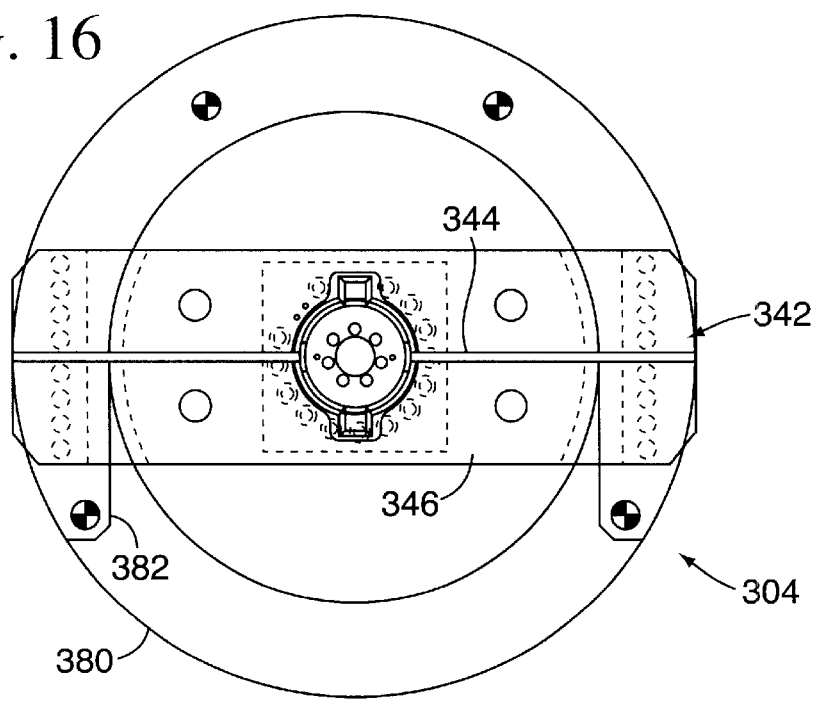
FIG. 16 is a top view of the upper bridge component depicted in FIG. 15.
Figure 15:
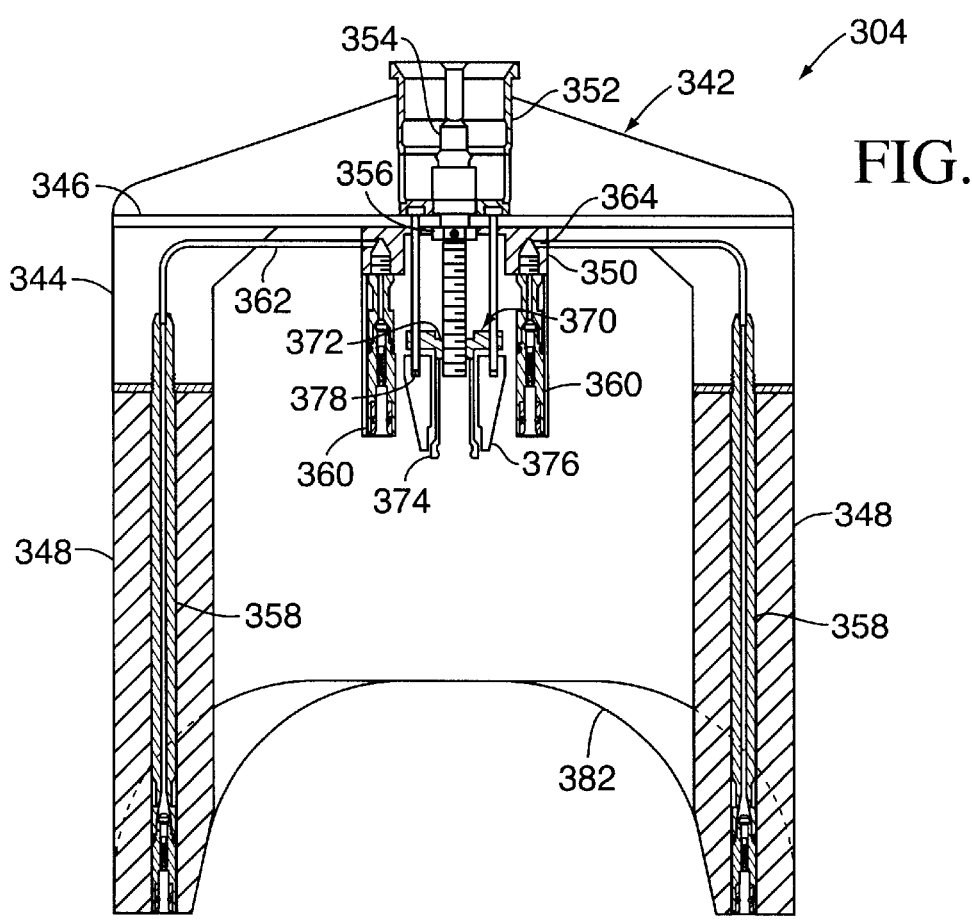
FIG. 15 is a sectional view of the upper bridge component of the controls bridge which is associated with the lower bridge component depicted in FIG. 13.

Referring to FIGS. 15 and 16, the upper bridge component 304 is shown to be similar in many respects to the bridge assembly 204 discussed above. Thus, the upper bridge component 304 comprises a second body portion 342 which includes a vertical, generally U-shaped frame plate 344 connected to a horizontal, generally rectangular platform 346, preferably two coupling sleeves 348 which are connected to the frame plate 344, a bushing 350 which is affixed to the bottom of the platform 346, a receptacle 352 which is connected to the top of the platform 346, a shaft 354 which extends through the platform 346 and is rotatably connected thereto by a shaft collar 356, a number of third coupling member 358 which are secured within respective vertical bores in the coupling sleeves 864, a corresponding number of fourth coupling member 360 which are secured within respective receptacles in the bottom of the bushing 350, and a number of bridge lines 362, each of which extends between a third coupling member 358 and a hole 364 in the bushing sleeve that communicates with a corresponding fourth coupling member 360. Each third coupling member is adapted to engage a matching fifth coupling member 366 that is mounted to one of preferably two junction plates 368 which are secured to opposite sides of the tubing spool 16 (See FIG. 17A). In addition, each fourth coupling member 360 is adapted to engage a corresponding second coupling members 336 in the lower bridge component 302. Thus, for example, the third and fourth coupling members 358, 360 may be the female component of a conventional hydraulic coupler and the fifth coupling members may be the male component of the hydraulic coupler.

In the present embodiment, the upper bridge component 304 also comprises a lock sleeve 370 which includes a base portion 372 that is threadedly connected to the shaft 354, a plurality of locking fingers 374 which depend downwardly from the base portion 372, a cone-shaped cam sleeve 376 which is connected at a predetermined distance to the platform 346 by a number of bolts 378, and preferably a generally cylindrical housing 380 which is connected to the second body portion 342 by suitable means, such as bolting or welding. The housing 380 may include a cutout window portion 382 in its side surface to allow the upper bridge component 304 to be installed on the tubing spool 16 without having to be elevated completely above the tubing spool.

Figure 17A:
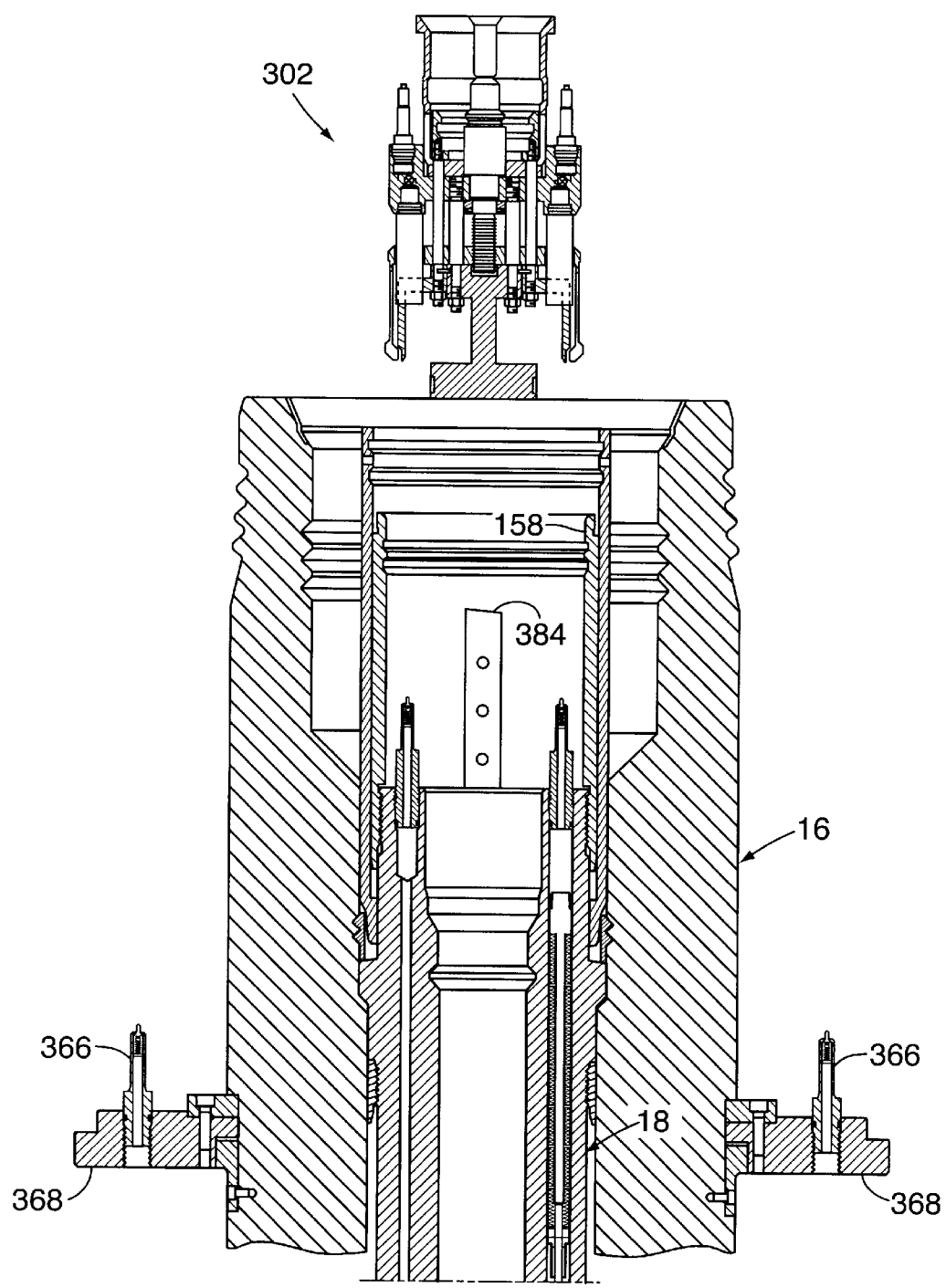
FIGS. 17A–17F are sequential views of the lower bridge component depicted in FIG. 13 being landed on and locked to a tubing hanger and the upper bridge component depicted in FIG. 15 being landed on and locked to the lower bridge component.
Figure 17C:
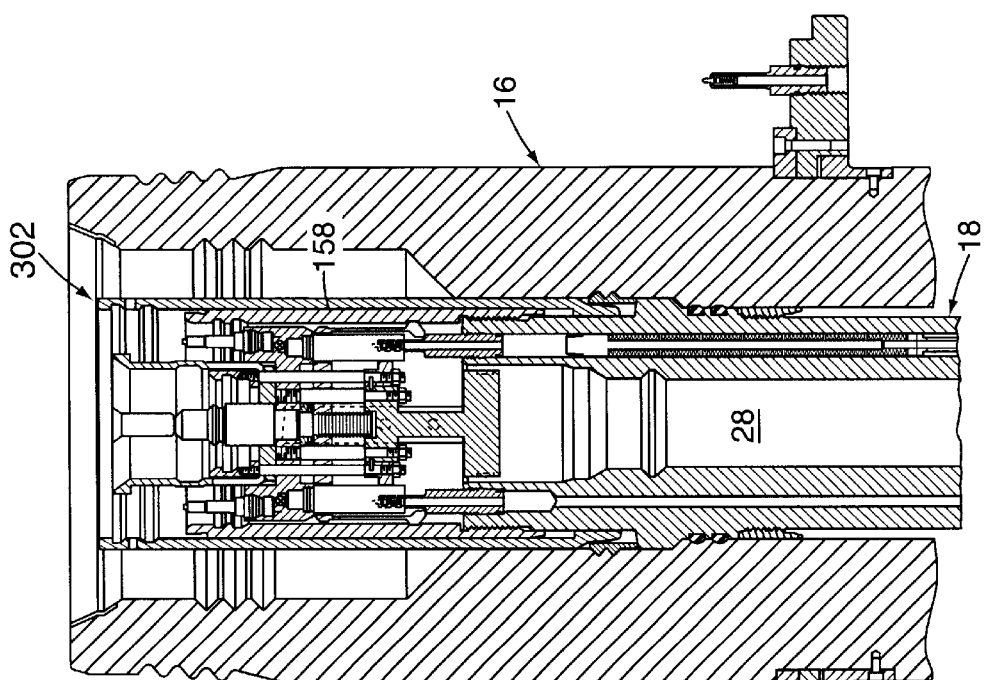
Figure 17B:
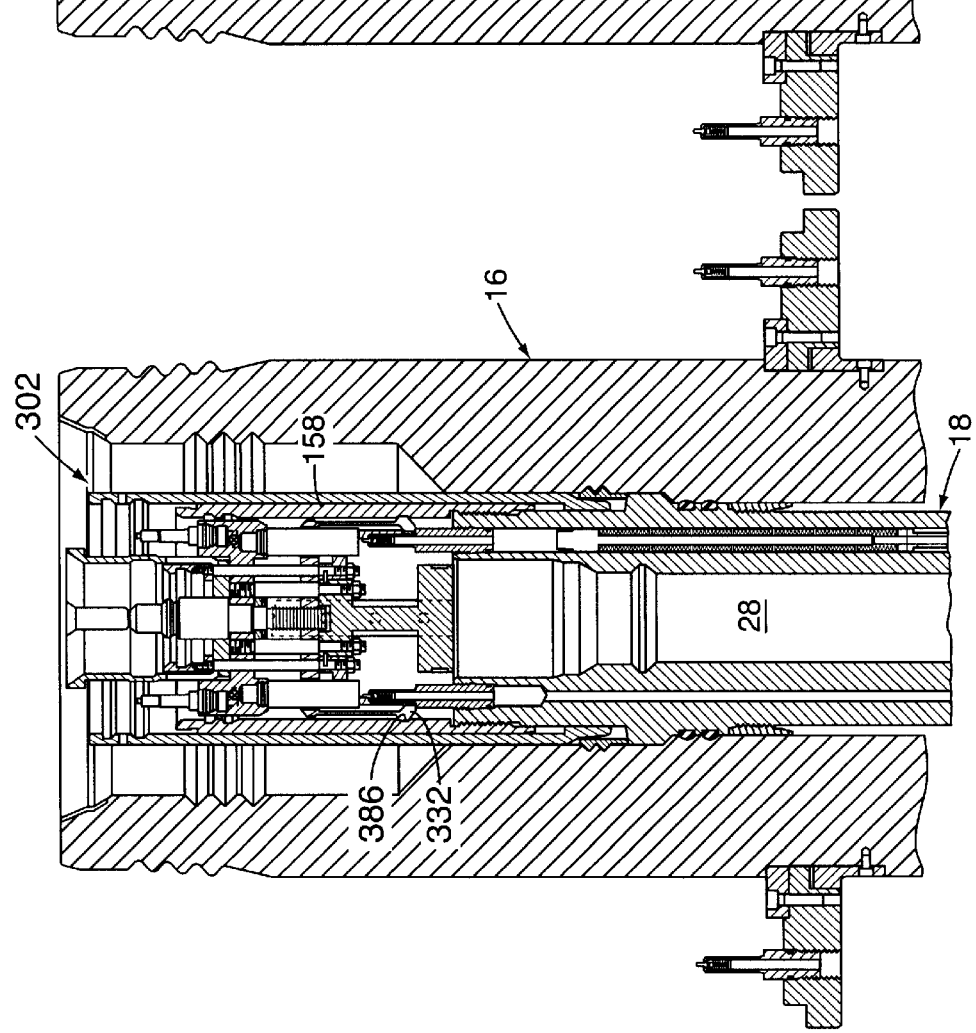

The installation of the controls bridge 300 will be described with reference to FIGS. 17A–17F. The lower bridge component 302 is first installed, followed by the upper bridge component 304. Both the upper and lower bridge components are preferably sufficiently lightweight to be installed using an ROV or any of the methods previously discussed. The lower bridge component 302 is first lifted from its docking fixture (not shown), moved over the tubing spool 16, and roughly aligned with the upper extension 158 of the tubing hanger 18 (FIG. 17A). The lower bridge component 302 is then lowered toward the tubing hanger 18 until a key 384 on the upper extension 158 engages an alignment slot (not shown) on the first body portion 306 to precisely align the lower bridge component with the tubing hanger 18. The lower bridge component is further lowered until the collet fingers 332 engage a groove 386 formed on the inner diameter of the upper extension 158 (FIG. 17B).

At this point the actuation mechanism of the lower bridge component 302, which comprises certain of the components described above that will be discussed hereafter, is actuated to lock the collet sleeve 330 against the upper extension 158 and then to engage the first coupling members 334 with their corresponding coupling members in the tubing hanger 18. This is accomplished by rotating the shaft 324 which, due to the threaded engagement between the shaft and the collet sleeve 330, will pull the first body portion 306 downward relative to the collet sleeve. This will move a locking cam 388 which depends downwardly from the locking sleeve 316 behind the collet fingers 332 to trap them in the groove 386 and thereby firmly secure the lower bridge component 302 to the upper extension 158. Further rotation of the shaft 324 will then bring the first coupling members 334 into engagement with their corresponding coupling members in the tubing hanger 18. In addition, the bore plug 308 will preferably now be sealingly engaged in the production bore 28 of the tubing hanger 18 (FIG. 17C).

Figure 17D:
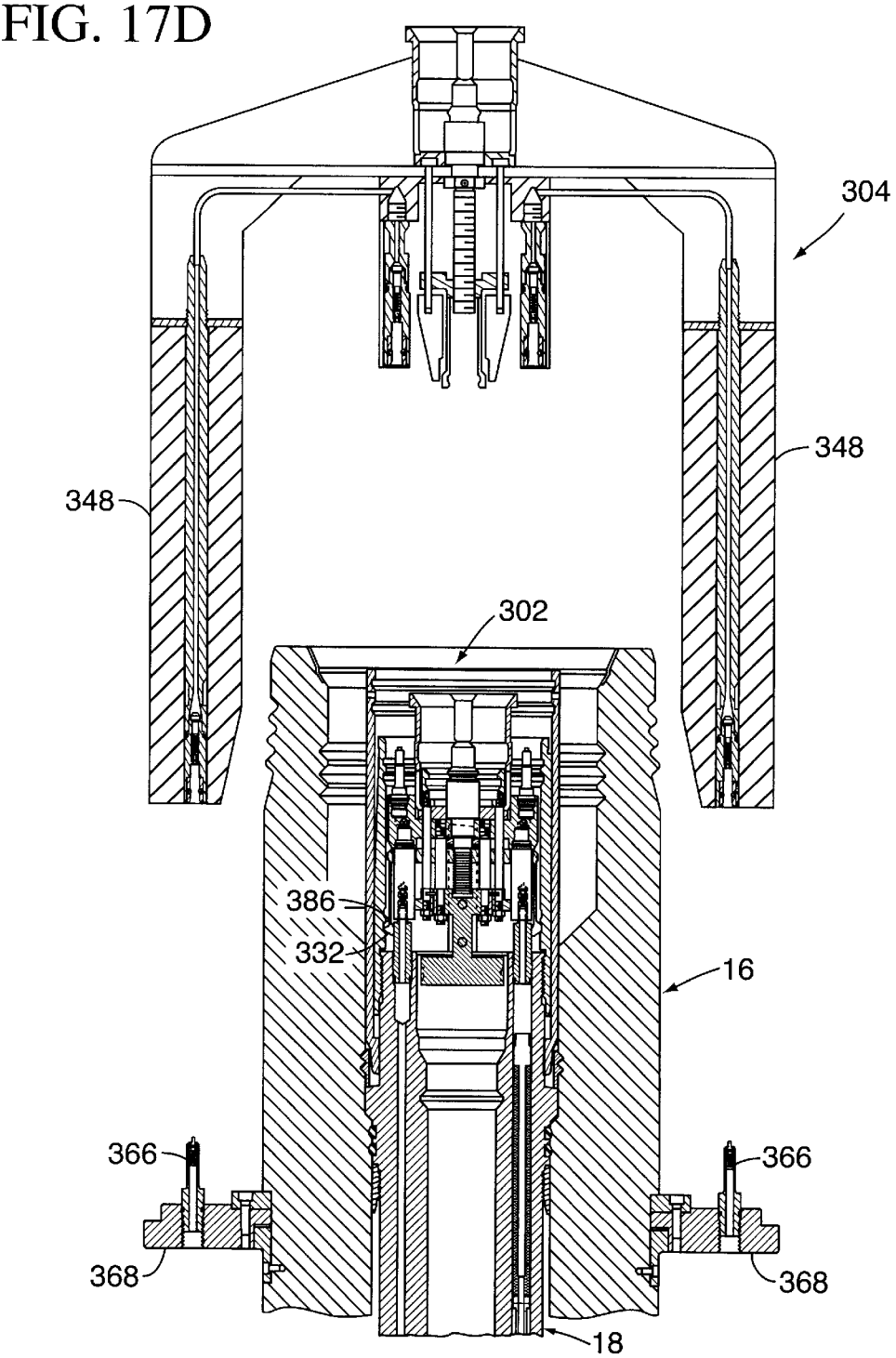

Next, the upper bridge component 304 is lifted off of its docking fixture (not shown) and moved over the tubing spool 16, and the coupling sleeves 348 are roughly aligned with the junction plates 368 (FIG. 17D). The upper bridge component 304 is then lowered onto the lower bridge component 302 and is aligned therewith using any of the alignment means previously discussed. As the upper bridge component 304 is lowered, the locking fingers 374 will land and engage on a corresponding profile 390 formed on the upper portion of the shaft 324 of the lower bridge component 302. In this position, the third and fourth coupling members 358, 360 will be immediately over the fifth and second coupling members 366, 336 (FIG. 17E).

At this point the actuation mechanism of the upper bridge component 304, which comprises certain of the components described above that will be discussed hereafter, is actuated to lock the upper bridge component to the lower bridge component 302 and then engage the third and fourth coupling members 358, 360 with the fifth and second coupling members 366, 336. This is accomplished by rotating the shaft 354 which, due to the threaded engagement between the shaft and the lock sleeve 370, will pull the shaft, and thus the second body portion 342, downward and move the cam sleeve 376 behind the locking fingers 374 to trap them against the profile 390 and thereby firmly secure the upper bridge component 304 to the lower bridge component 302.

Figure 17F:
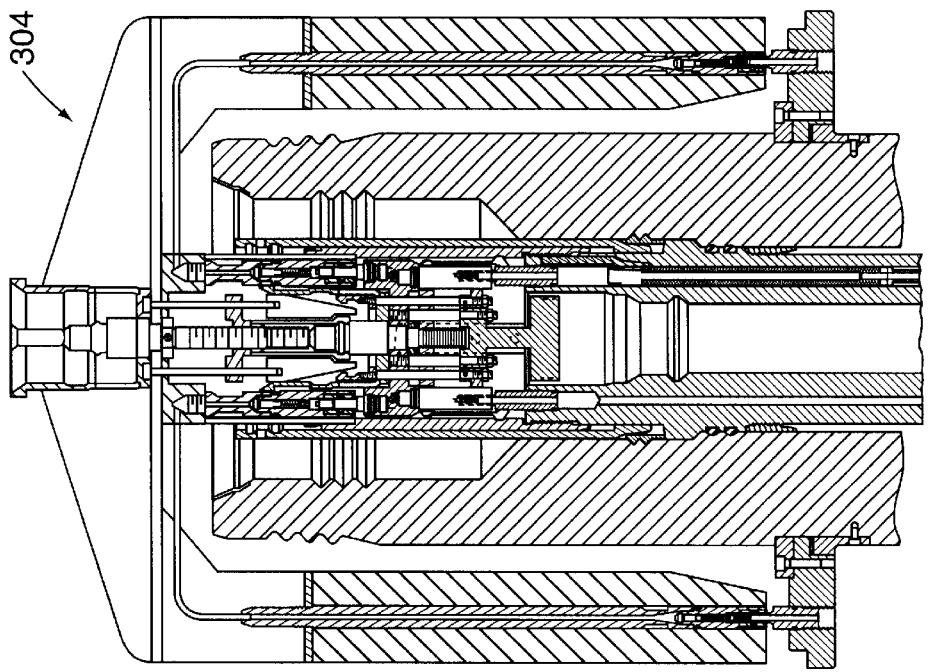
Figure 17E:
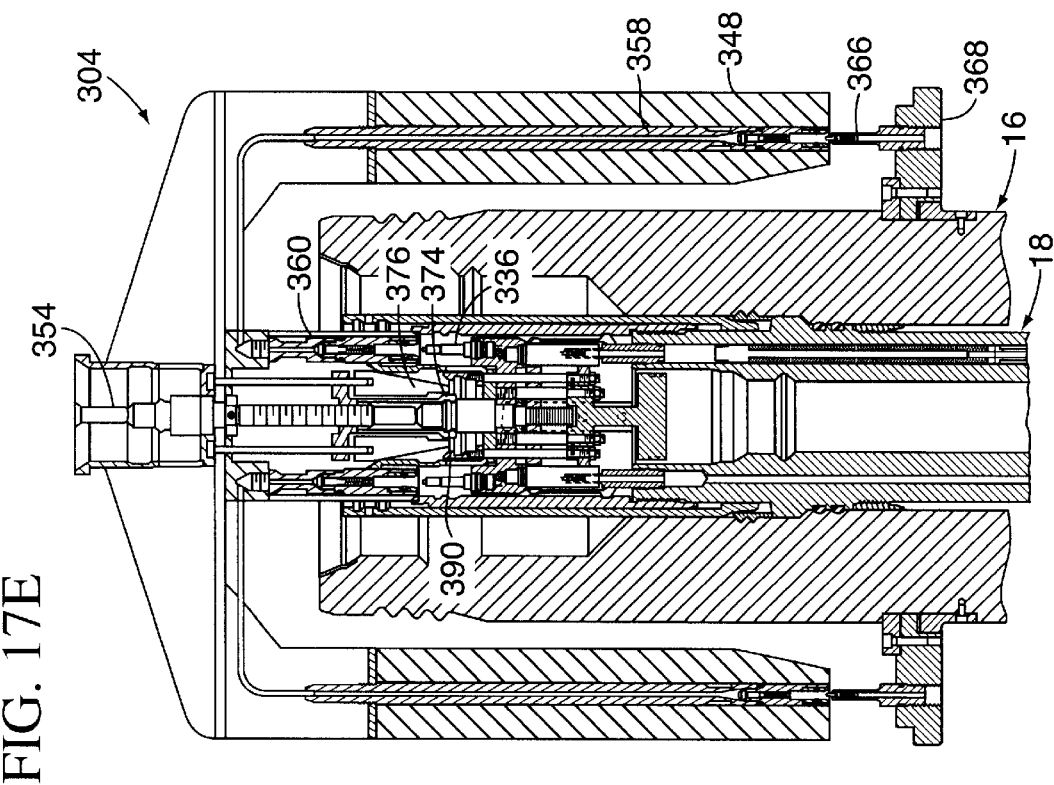

Further rotation of the shaft 354 will then bring third and fourth coupling members 358, 360 into engagement with the fifth and second coupling members 366, 336, respectively, to establish communication therebetween (FIG. 17F). The upper and lower bridge components may also be retrieved individually by reversing the above steps.

While the structures of the various controls bridge embodiments have been discussed, some examples of the many connections which may be made between the tubing hanger, the tubing spool, the controls bridge and subsea controls module or controls pod, and the number and variety of closure members and other devices that may be housed in these components, are schematically illustrated in FIGS. 18A–18D. It should be understood, however, that other variations and combinations may be derived by those skilled in the art from the teachings herein and are therefore considered to be within the scope of the present invention.

Figure 18A:
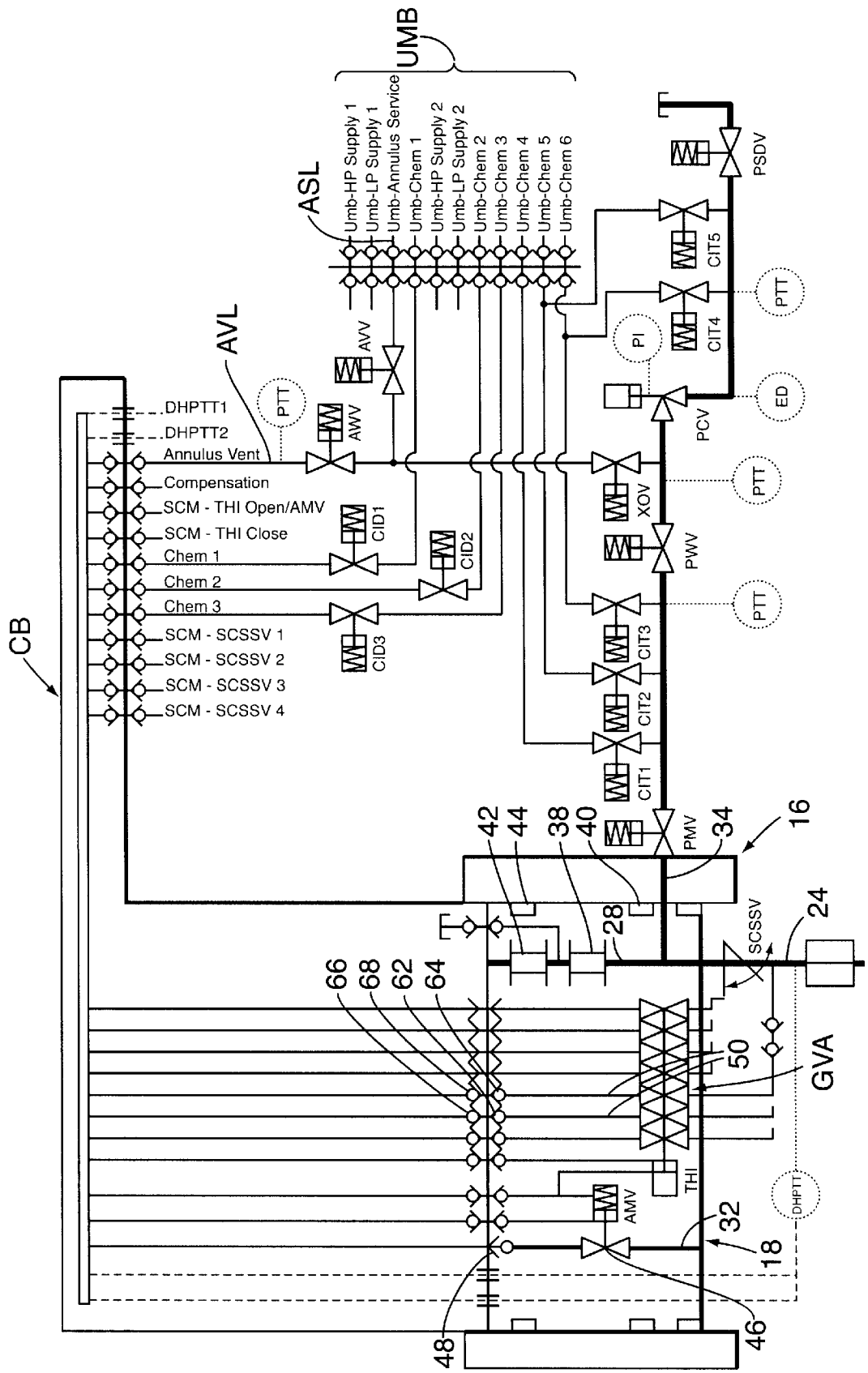
FIGS. 18A–18D are schematic representations of various alternative arrangements of the controls bridge of the present invention being connected to the tubing hanger and tubing spool components of an exemplary flow completion system.

FIG. 18A depicts an embodiment of the present invention wherein the closure members required for isolating the well bore from the environment are housed primarily in the tubing hanger 18. Thus, the production bore 28 is sealed by two wireline plugs 38, 42; the tubing hanger 18 is sealed to the tubing spool 16 with two annular seals, such as the first and second seals 40, 44 discussed above; flow through the annulus bore 32 is controlled by an annulus master valve AMV, such as the gate valve 46 discussed above, and possibly also a passive closure member such as the check valve 48; and flow through each service and control conduit 50 which is exposed to the well bore is controlled by both an active closure member, such as the multiport gate valve assembly GVA disclosed in applicants' co-pending U.S. patent application Ser. No. 09/815,395 filed Mar. 22, 2001; and preferably also a passive closure member, such as the first coupling members 62, 64 discussed above. In this example, the controls bridge CB houses no closure members other than the second coupling members 66, 68 which correspond to the first coupling members 62, 64. Rather, all the closure members and other devices which are required to isolate the well bore from the environment are supported on the tubing hanger 18. Therefore, the controls bridge may be installed and retrieved without the need for a blowout preventer ("BOP") and a marine riser.

FIG. 18A also illustrates how the controls bridge CB may be used to facilitate certain workover operations of the flow completion system 12. The annulus bore 32 in the tubing hanger 18 communicates through a bridge line in the controls bridge with an annulus vent line AVL that is connected to the tubing spool 16. This annulus vent line in turn is connected via an annulus wing valve AWV to a crossover valve XOV that is mounted on the tubing spool 16, which in turn communicates with the production outlet 34. In addition, the annulus vent line AVL is connected via an annulus vent valve AW to an annulus service and control line ASL in an external umbilical UMB. With this combination of annulus lines and valves, a variety of circulation paths between the production and annulus flow paths may be achieved.

Figure 18B:
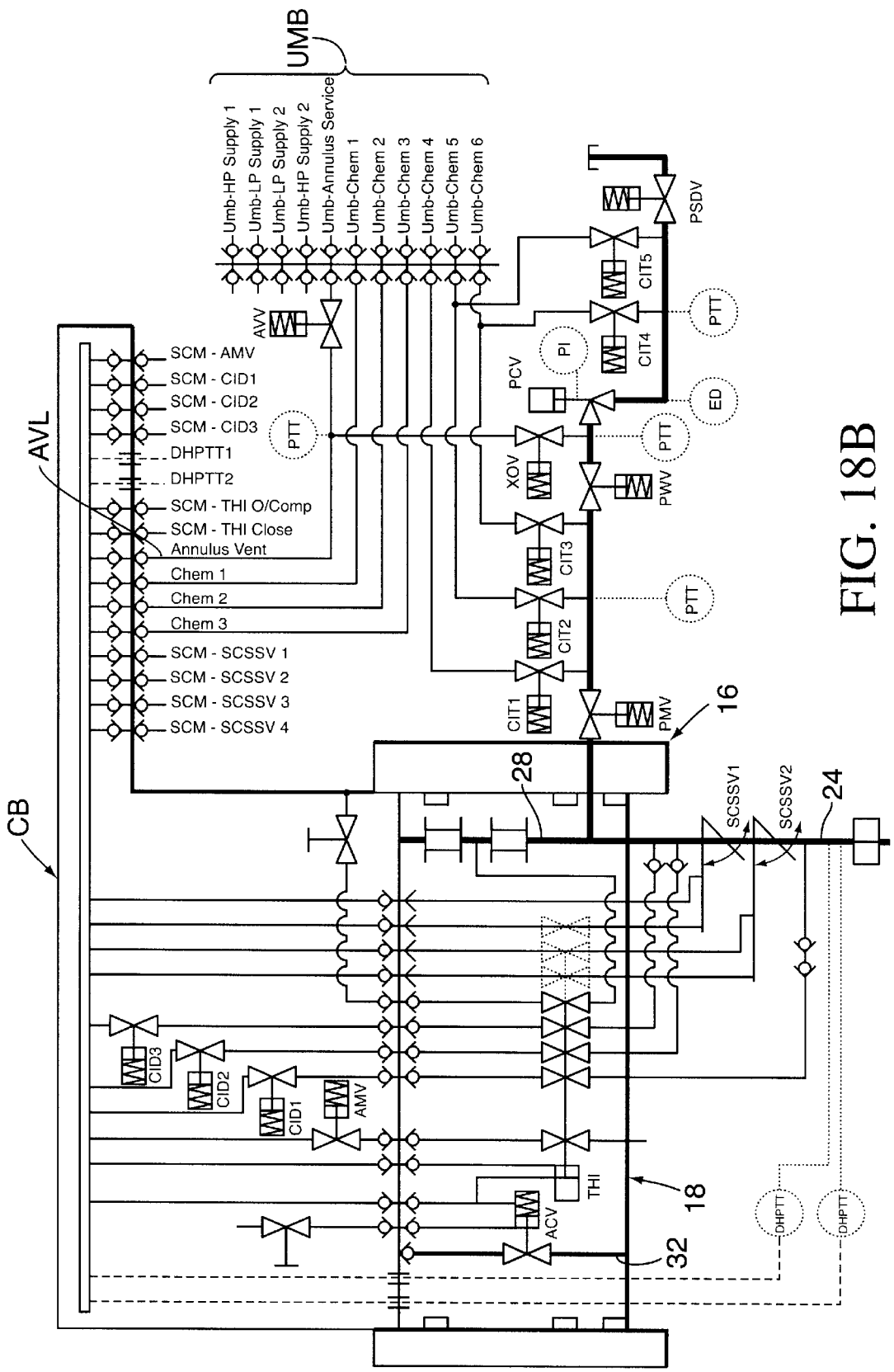

FIG. 18B depicts another variation for the controls bridge CB of the present invention. In this embodiment, several of the chemical injection valves CID that are shown mounted to the tubing spool 16 in FIG. 18A are now located in the controls bridge. In addition, the controls bridge CB houses an annulus master valve AMV which is connected between the annulus bore 32 in the tubing hanger 18 and an annulus vent line AVL in the controls bridge, which in turn is connected through an annulus vent valve AW to an external service and control line in the umbilical UMB. The positioning of these devices in the controls bridge makes servicing of these devices relatively simple and inexpensive since doing so only requires retrieval of the controls bridge, not the tubing hanger or the tubing spool.

Figure 18C:
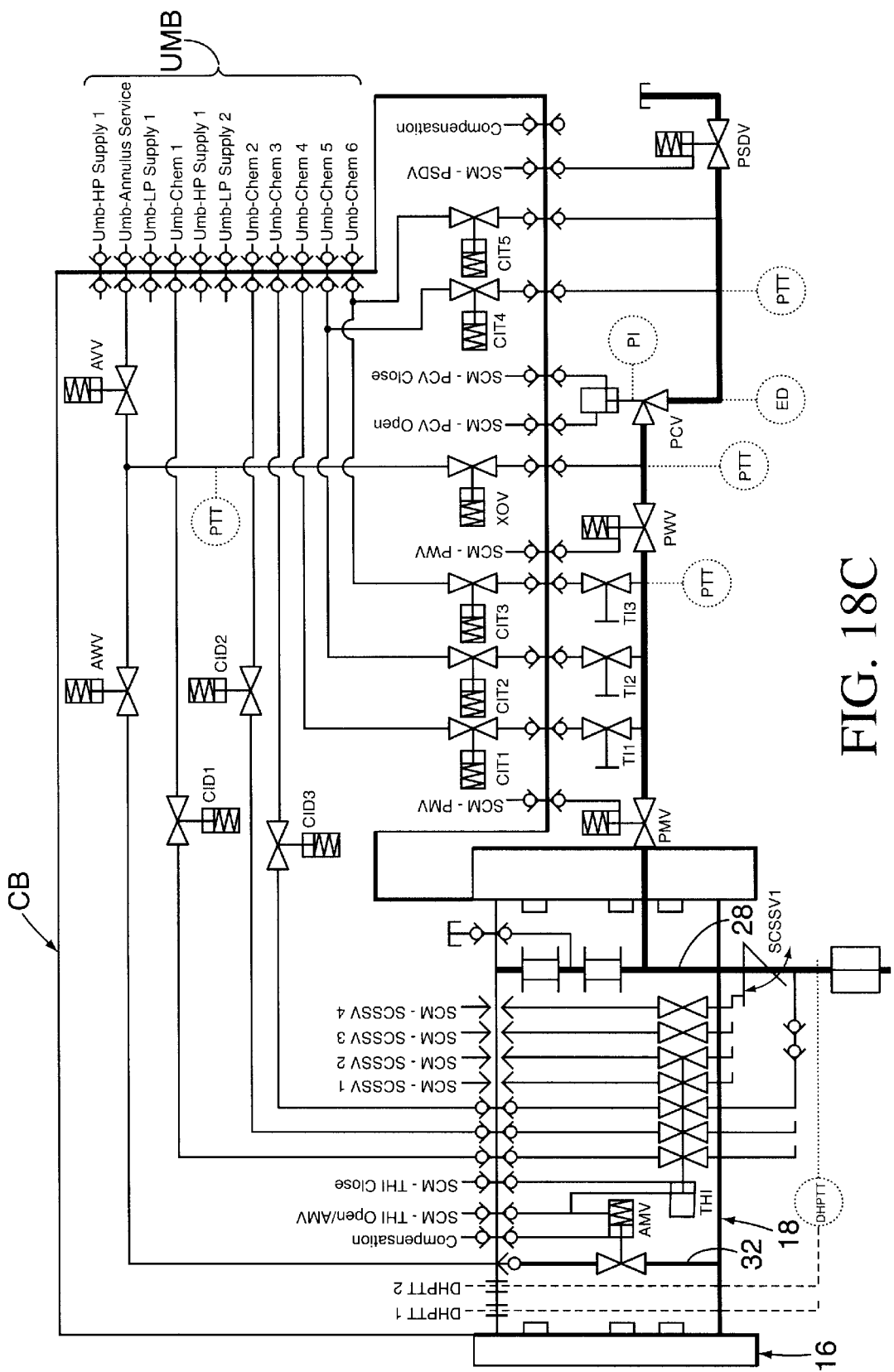

FIG. 18C illustrates an embodiment of a controls bridge CB that includes several devices that are typically mounted on the tubing spool, such as an annulus wing valve AWV, and annulus vent valve AW, a crossover valve XOV, and several chemical injection valves CIT. In these embodiments, the external umbilical UMB connects directly to the controls bridge, and the service and control lines required to operate certain devices mounted on the tubing spool 16 may extend from the controls bridge either directly to theses devices, or first to a junction plate mounted on the tubing spool and then via a jumper to the devices. The devices that are mounted in the controls bridge may be services relatively easily by simply retrieving the controls bridge. Moreover, since the tubing hanger in this embodiment comprises all the industry-required barriers between the well bore and the environment, the controls bridge may be retrieved without the need for a BOP and a marine riser.

Figure 18D:
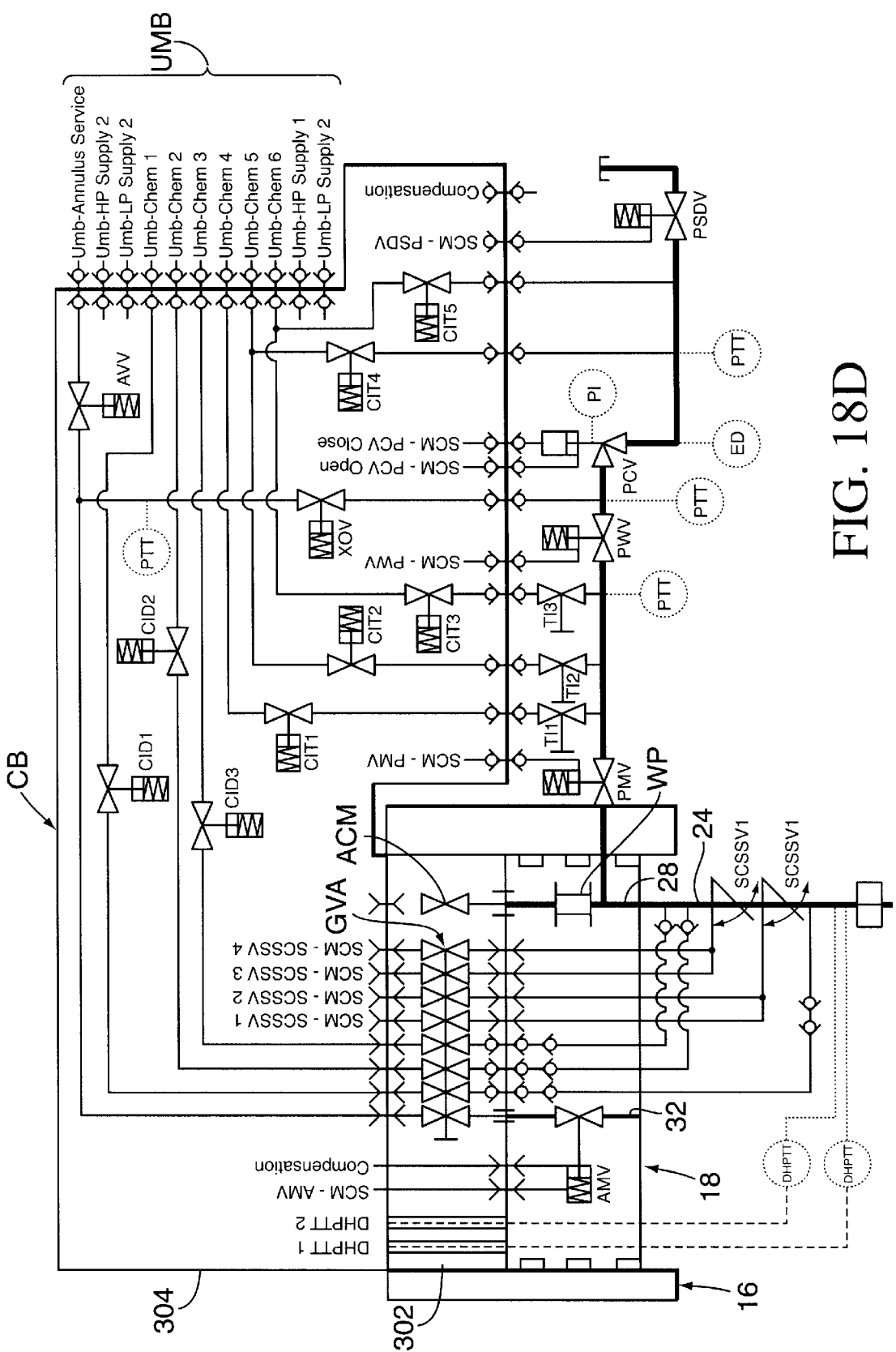

FIG. 18D illustrates a flow completion system having a controls bridge CB which is similar to the controls bridge 300 discussed above. Thus, the controls bridge comprises a lower bridge component 302 and an upper bridge component 304. In this example, the upper bridge component 304 includes many of the components which are typically mounted on the tubing spool, such as an annulus vent valve AW, a crossover valve XOV and several chemical injection valves CID and CIT. In addition, although the tubing hanger 18 is sealed to the tubing spool 16 with two seals such as the first and second seals 40, 44, the tubing hanger 18 in this embodiment comprises only a single annulus valve AMV for controlling flow through the annulus bore 32 and only a single wireline plug WP for controlling flow through the production bore 28. Consequently, the tubing hanger 18 provides only a single barrier between the well bore and the environment.

In this embodiment, however, the lower bridge component 302 provides the industry-required second barrier between the well bore and the environment. Thus, the lower bridge component 302 preferably comprises a multiport gate valve assembly GVA, or any other suitable independent closure members, for controlling flow through the bridge lines which are connected to the annulus bore 32 and the service and control conduits 50 in the tubing hanger 18. The lower bridge component also comprises a preferably active closure member ACM, such as a gate valve, for controlling flow through a bridge line that is connected to the production bore 24. Thus, the tubing hanger TH comprises few, if any, devices that would normally require servicing during the life of the well. In addition, since the lower bridge component 302 provides the second barrier between the well bore and the environment, the upper bridge component 304 may be retrieved without the need for a BOP and a marine riser.

Figure 19:
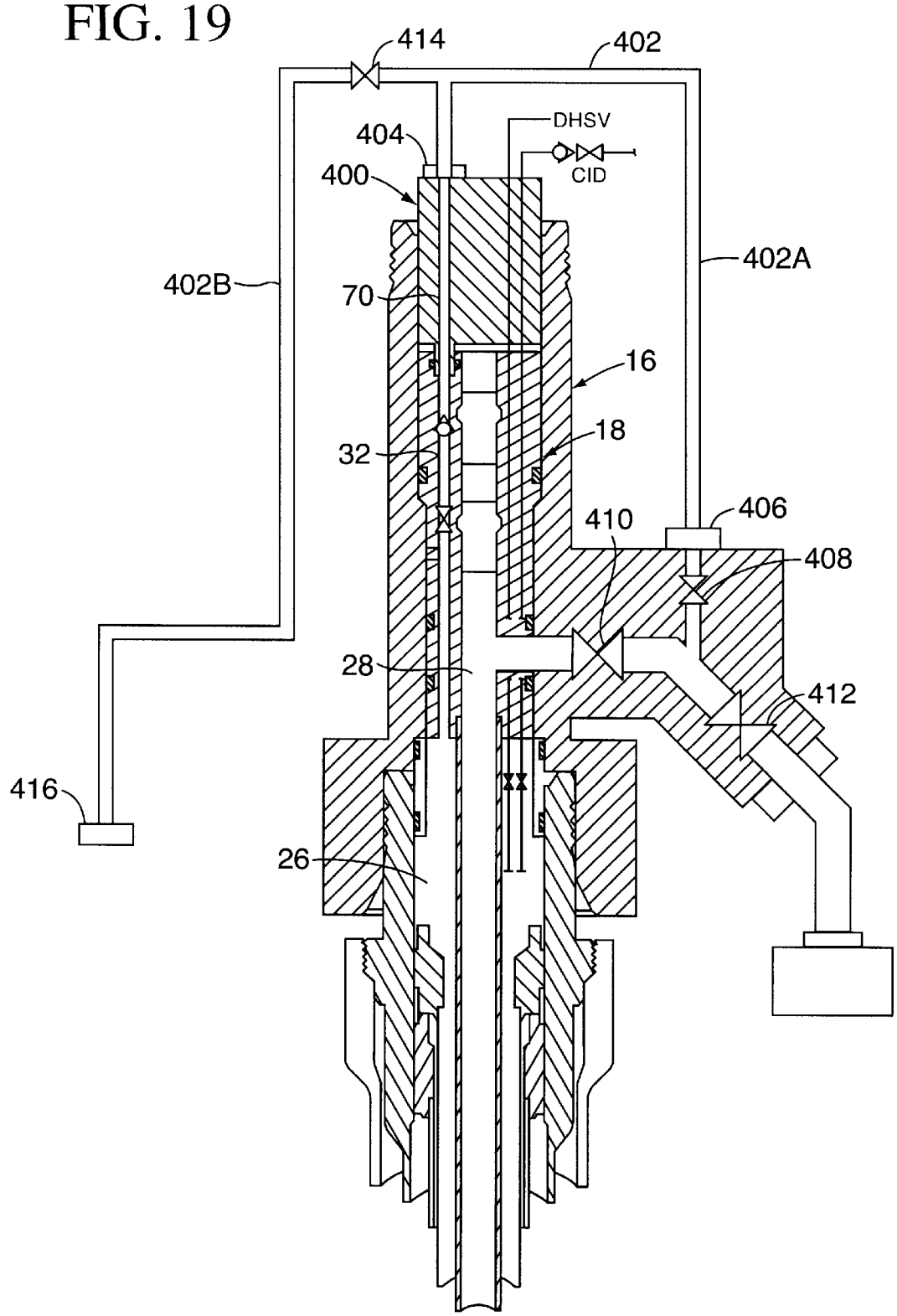
FIG. 19 is a schematic representation of another embodiment of the controls bridge of the present invention shown installed on another exemplary flow completion system.

Referring now to FIG. 19, an embodiment of a controls bridge 400 is shown which facilitates the connection of an external annulus line 402 to the annulus bore 32 in the tubing hanger 18. A described above in connection with controls bridge 10, the annulus bore 32 is connected to a bridge line 70 in the controls bridge 400 through suitable first and third coupling members 62,112. In this embodiment of the invention, the bridge line 70 is connected directly to the external annulus line 402 using a suitable connector 404. The external annulus line 402 comprises a branch 402A which is routed back to the tubing spool 16 for communication with the production bore 28 in the manner of a crossover line. The branch 402A connects to the tubing spool 16, or a valve block which is attached to the tubing spool, using an appropriate connector 406, which communicates with the production outlet 34 through a crossover valve 408. However, the crossover line 402A may also be interfaced to the production bore 28 upstream of a production master valve 410 or downstream of a production wing valve 412, as is known in the art. The external annulus line 402 also preferably includes a second branch 402B that connects through an annulus wing valve 414 to either an annulus vent line in an umbilical or an annulus flowline (not shown) via a connector 416. Thus, the external annulus line 402 may be used to vent and monitor the tubing annulus 26 during production, as well as to circulate between the tubing annulus 26 and the production bore 28 during installation and workover, all through the controls bridge 400.

Figure 20:
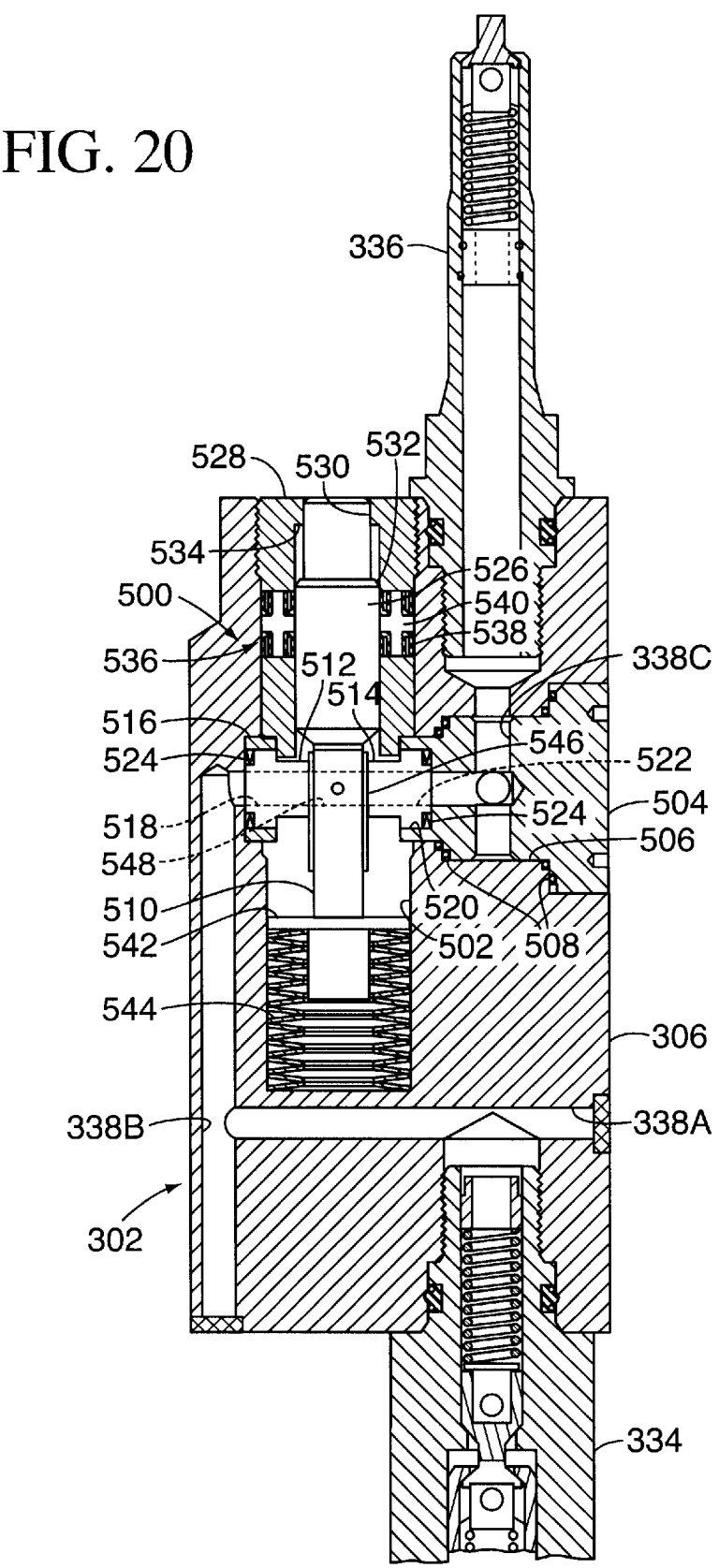
FIG. 20 is a partial sectional view of an exemplary controls bridge showing one embodiment of a gate valve assembly installed therein.

Referring now to FIG. 20, a gate valve assembly is depicted which is suitable for use to control flow through the bridge lines or passageways of any of the controls bridge embodiments discussed above. For purposes of the following description, the gate valve assembly, which is indicated generally by reference number 500, is shown installed in the lower bridge component 302 of the controls bridge 300. Although only one gate valve 500 is visible, several gate valves are preferably disposed radially around the axial centerline of the lower bridge component 302 to control flow through a corresponding number of respective passageways 338.

The gate valve 500 is positioned in an elongated gate cavity 502 that is formed in the first body portion 306 of the lower bridge component 302. In addition, the passageway 338 is shown to include a lower branch 338A that communicates with the first coupling member 334, an intermediate branch 338B that extends between the lower branch 338A and the gate cavity 502, and an upper branch 338C that extends between the gate cavity and the second coupling member 336. The upper branch 338C is preferably formed at least partially through a plug member 504 which is secured by suitable means in a corresponding orifice 506 that extends into the side of the first body portion 306 and intersects the gate cavity 502. The plug member 504 is ideally sealed to the first body portion 306 by a number of annular seals 508.

The gate valve 500 includes a gate 510 which is slidably disposed between a pair of seats 512, 514. The first seat 512 is mounted in a support ring 516 which in turn is positioned in an annular bore that is formed in the wall of the gate cavity 502. In addition, the first seat 512 includes an axial through bore 518 that is aligned with the intermediate branch 338B of the passageway 338. The second seat 514 is mounted in an annular bore 520 that is formed in the inner end of the plug member 504, and the second seat includes an axial through bore 522 which is aligned with the upper branch 338C of the passageway 338. Furthermore, a biasing spring 524, such as a Belleville washer, is preferably positioned between each seat 512, 514 and its corresponding mounting bore to urge the seat into engagement with the gate 510.

The top of the gate 510 is connected to a valve stem 526 which is slidably supported in a bonnet assembly 528 that is secured in the top of the gate cavity 502 such as by threads. The top of the valve stem 526 extends through a hole 530 in the top of the bonnet assembly 528, and the valve stem includes an enlarged diameter shoulder 532 which is adapted to contact a rim 534 defined by the hole 530 to limit the upward movement of the valve stem in the bonnet assembly. In addition, the bonnet assembly 528 optimally includes a seal assembly 536 for sealing the valve stem 526 against the lower body portion 306. In the embodiment of the invention shown in FIG. 20, the seal assembly 536 comprises a number of annular, preferably U-shaped seals 538 that are separated by a seal support member 540. The bottom of the gate 510 is connected to a collet 542, and the gate valve 500 further includes a biasing member 544, such as a stack of Belleville washers, that is positioned between the collet and the bottom of the gate cavity 502. In addition, the gate 510 preferably includes a gate insert 546 which is positioned in a corresponding opening formed in the gate.

In operation, in the absence of an external actuating force the biasing member 544 will urge the gate 510 upward into the closed position, wherein a hole 548 extending through the gate insert 546 is offset from the through bores 518, 522 in the respective seats 512, 514. When it is desired to open the gate valve 500, an actuating force is applied to the top of the valve stem 526 to urge the gate 510 downward into the open position, wherein the hole 548 is aligned with the through bores 518, 522, as shown in FIG. 20. The biasing force may be applied, for example, by the upper bridge component 304 when that component is landed and locked onto the lower bridge component 302.

Figure 21:
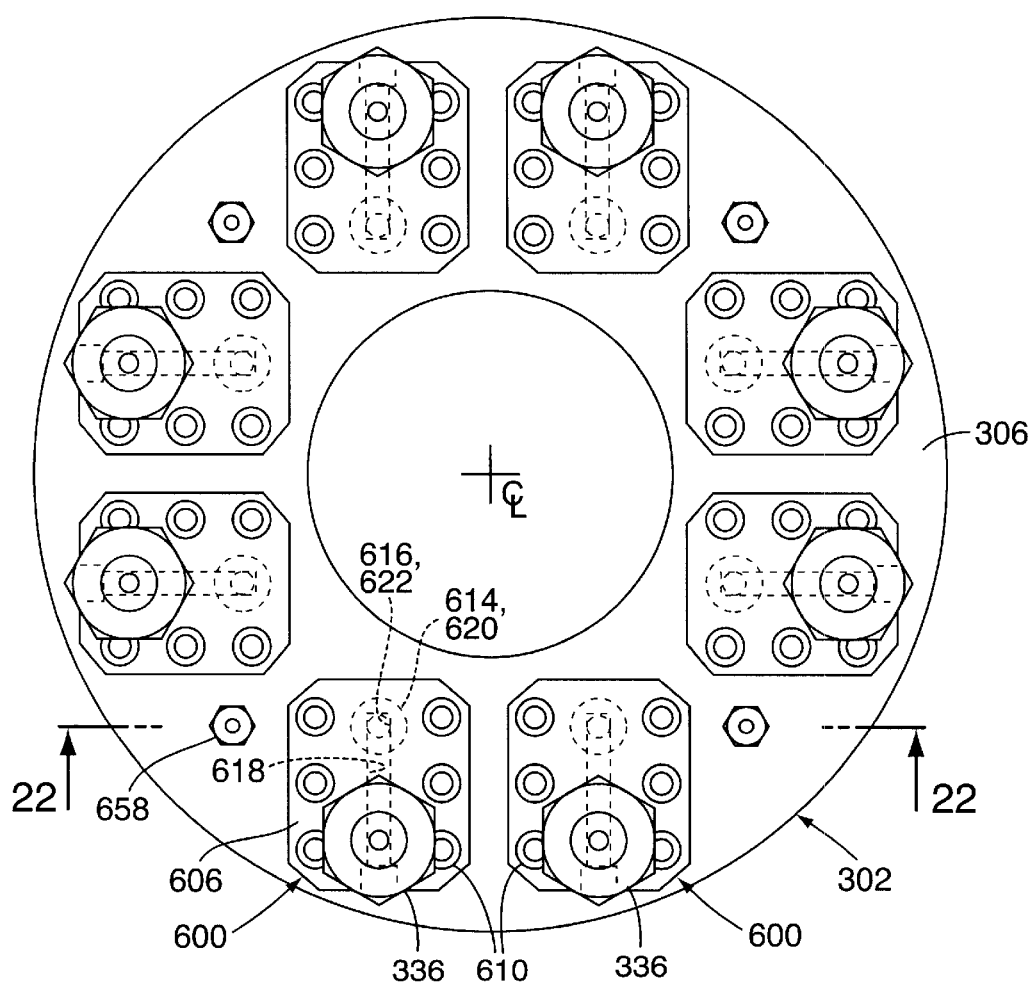
FIG. 21 is a top view of an exemplary controls bridge showing several of another embodiment of a gate valve assembly installed therein.
Figure 22:
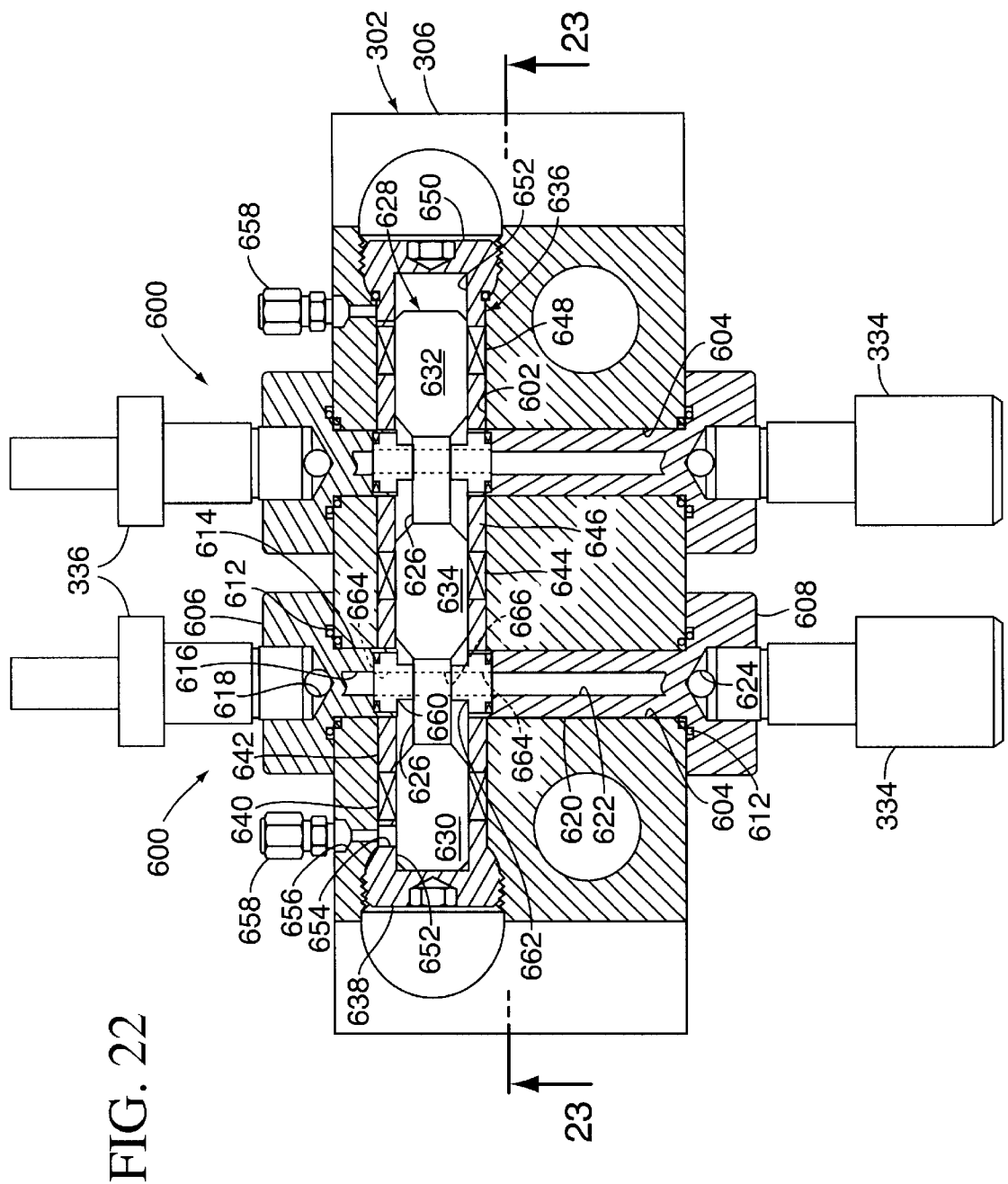
FIG. 22 is a sectional view of the controls bridge taken along line 22—22 of FIG. 21.
Figure 23:
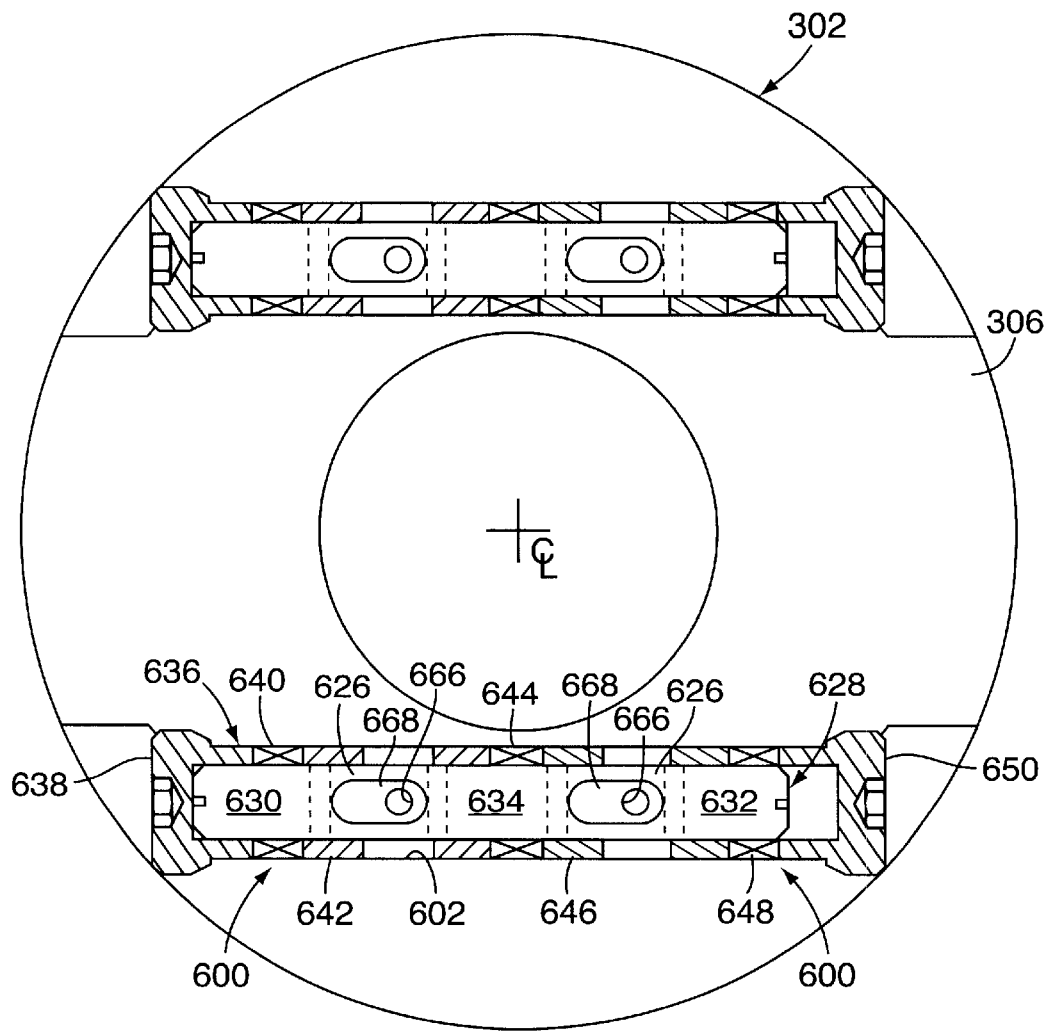
FIG. 23 is a sectional view of the controls bridge taken along line 23—23 of FIG. 22.

FIGS. 21–23 illustrate another embodiment of a gate valve which is suitable for use with the controls bridge embodiments of the present invention. In this embodiment, a number of gate valves 600 are shown installed on the lower bridge component 302 of the controls bridge 300. The gate valves 600 are preferably grouped in pairs which are arranged radially around the axial centerline CL of the lower bridge component 302. As will be described below, this allows a single actuating mechanism to be used to actuate the pair of gate valves simultaneously, thus simplifying the construction and operation of the lower bridge component.

As shown in FIG. 22, each pair of gate valves 600 ideally shares a single stem bore 602 that extends laterally preferably completely through the first body portion 306 of the lower bridge component 302. In addition, each gate valve 600 is partially positioned in a valve bore 604 that extends axially preferably completely through the first body portion 306 and intersects the gate cavity 602. The portion of the valve bore 604 above the stem bore 602 is sealed by a first cover member 606, while the portion of the valve bore 604 below the stem bore 602 is sealed by a second cover member 608. Each cover member 606, 608 is secured to the first body portion 306 of the lower bridge component 302 by suitable means, such as bolts 610, and a number of annular seals 612 are preferably provided to seal the cover member against the first body portion.

The first and second cover members 606, 608 define a flow passage through the gate valve 600 which is connected at one end to a first coupling member 334 of the lower bridge component 302 and at the other end to a second coupling member 336 of the lower bridge component. Accordingly, the first cover member 606 includes a first plug portion 614 that extends through the valve bore 604 substantially to the stem bore 602, a first longitudinal bore 616 that extends through the first plug portion 614 and communicates with the stem bore 602, and a first transverse bore 618 that extends between the first longitudinal bore 616 and an aperture into which the second coupling member 336 is secured. Similarly, the second cover member 608 comprises a second plug portion 620 that extends through the valve bore 604 substantially to the stem bore 602, a second longitudinal bore 622 that extends through the second plug portion 620 and communicates with the stem bore 602, and a second transverse bore 624 that extends between the longitudinal bore 622 and an aperture into which the first coupling member 334 is secured. As shown in FIG. 21, the first and second cover members 606, 608 are positioned in the valve bore 604 such that the first and second longitudinal bores 616, 622 are aligned. In this manner, the flow passage for the gate valve 600 is defined by the first transverse bore 618, the first and second longitudinal bores 616, 622, and the second transverse bore 624. However, it should be understood that the first and second transverse bores 618, 624 could be eliminated and the first and second coupling members 334, 336 connected instead directly to the second and first longitudinal bores 622, 616, respectively.

Referring to FIGS. 22 and 23, each gate valve 600 is shown to comprise a gate 626 which optimally forms part of a unitary valve stem 628 that extends through the stem bore 602. The valve stem 628 includes a first end piston 630 which is attached to the first gate 626, a second end piston 632 which is attached to the second gate 626, and a middle piston 634 which extends between the two gates 626. In addition, the valve stem 628 is slidably disposed in a seal sleeve assembly 636 which is positioned in the stem bore 602 and which includes, from left to right in FIGS. 22 and 23, a first plug 638 that is secured in a first end of the stem bore 602 such as by threads, a first annular packing 640 which seals between the first end piston 630 and the stem bore, a first spacer sleeve 642, a middle annular packing 644 which seals between the middle piston 634 and the stem bore, a second spacer sleeve 646, a second annular packing 648 that seals between the second end piston 632 and the stem bore, and a second plug 650 that is secured in the second end of the stem bore such as by threads. The first and second plugs 638, 650 each comprise a blind bore 652 that, together with the respective first and second packing 640, 648, forms a pressure chamber with the end of the respective first and second end piston 630, 632. In addition, the first and second plugs 638, 650 each include a port 654 that communicates with both the pressure chamber and a corresponding opening 656 formed in the first body portion 306 to which a conventional hydraulic coupling 658 is attached.

As shown best in FIG. 22, each gate 626 is slidably disposed between a pair of seats 660, 662. The first seat 660 is mounted in an annular recess which is formed in the end of the first plug portion 614 adjacent the stem bore 602. Similarly, the second seat 662 is mounted in an annular recess which is formed in the end of the second plug portion 620 adjacent the stem bore. In addition, each seat 660, 662 comprises a through bore 664 which aligns with the respective longitudinal bores 616, 622 in the plug portions 614, 620. Furthermore, a biasing spring, such as a Belleville washer, is preferably positioned between each seat 660, 662 and its corresponding recess to urge the seat into engagement with the gate 626. Also, the first and second spacer sleeves 642, 646 each preferably include separate first and second segments which are disposed on opposite sides of the first and second plug portions 614, 620 to allow the seats 660, 662 to freely contact the gate 626.

In operation, both gate valves 600 of a pair are operated simultaneously by actuation of the single valve stem 628. The gate valves 600 may initially be in either the open position, in which a hole 666 in the gate 626 is aligned with the through bores 664 in the seats 660, 662, as shown in FIG. 22, or in the closed position, in which the hole 666 is offset from the through bores 664. If the gate valves 600 are initially in the open position, they may be closed by introducing hydraulic fluid into the pressure chamber adjacent the first end piston 630 through the hydraulic coupler 658 to force the valve stem 628, and thus the gates 626, to the right and into the closed position. When desired, the gate valves 600 may then be closed by introducing hydraulic fluid into the pressure chamber adjacent the second end piston 632 to force the valve stem 628, and thus the gates 626 to the left and into the open position.

However, each gate valve 600 of a pair need not be in the same position. Thus, a first gate valve 600 may be in the open position while a second gate valve is in the closed position. Actuation of the valve stem 628 will then move the first gate valve into the closed position and the second gate valve into the open position. As shown in FIG. 23, this arrangement may be facilitated by providing each gate 626 with a gate insert 668 in which the hole 666 is formed. The insert 668 is received in a corresponding aperture which is formed in the gate 626. Thus, by simply orienting the gate insert 668 in each gate 626 as desired, each gate valve 600 may initially be either opened or closed.

It should be recognized that, while the present invention has been described in relation to the preferred embodiments thereof, those skilled in the art may develop a wide variation of structural and operational details without departing from the principles of the invention. For example different features of the various embodiments may be combined in a manner not described herein. Therefore, the appended claims are to be construed to cover all equivalents falling within the true scope and spirit of the invention.

What is claimed is:

1. A controls bridge for a flow completion system which comprises a tubing spool having a production outlet, a tubing hanger having a production bore that communicates with the production outlet and at least one service and control conduit extending therethrough, and at least one external service and control line that terminates near the tubing spool, the controls bridge comprising:

a first body portion;

means for securing the first body portion to the top of the tubing spool and/or the tubing hanger;

at least one first coupling member which is adapted to engage a second coupling member that is mounted in the service and control conduit;

at least one third coupling member which is adapted to engage a fourth coupling member that is connected to the external service and control line;

a bridge line which is connected between the first coupling member and the third coupling member;

a first actuating means for moving the first coupling member into engagement with the second coupling member;

a second actuating means for moving the third coupling member into engagement with the fourth coupling member;

wherein the first and second actuating means are selectively operable to connect the service and control conduit to the external service and control line through the coupling members and the bridge line.

2. The controls bridge of claim 1, wherein the first actuating means is connected to the second actuating means, whereby movement of the first and third coupling members is simultaneous.

3. The controls bridge of claim 1, wherein the first actuating means comprises:

an actuating sleeve which includes a piston portion that is slidably received in a piston chamber that is connected to the first body portion; and an actuating flange which is movably connected to the first body portion;

wherein the first coupling member is connected to the actuating flange; and wherein the application of pressure to the piston chamber will push the actuating sleeve against the actuating flange, which in turn will push the first coupling member into engagement with the second coupling member.

4. The controls bridge of claim 3, further comprising means for locking the first coupling member into engagement with the second coupling member.

5. The controls bridge of claim 4, wherein the locking means comprises:

a lock ring which is slidably received on a cylindrical member that is fixed in position relative to the second coupling member when the first body portion is secured to the tubing spool and/or the tubing hanger; and a lock groove which is formed on the cylindrical member;

wherein when the first coupling member is in engagement with the second coupling member, the actuating sleeve will trap the lock ring in the lock groove and against the actuating flange;

whereby the lock ring will prevent the actuating flange from moving relative to the cylindrical member in a direction away from the second coupling member.

6. The controls bridge of claim 1, further comprising at least one closure member for controlling flow through the bridge line.

7. The controls bridge of claim 1, wherein the securing means comprises:

a plurality of collet fingers which are connected to the first body portion;

an actuating sleeve which includes a piston portion that is slidably received in a piston chamber that is connected to the first body portion; and an actuating flange which is movably connected to the first body portion;

wherein the application of pressure to the piston chamber will push the actuating sleeve against the actuating flange, which in turn will trap the collet fingers in a corresponding groove that is formed in the tubing hanger or the tubing spool.

8. The controls bridge of claim 1, further comprising:

a second body portion which is movably connected to the first body portion;

wherein the first and third coupling members are connected to the second body portion; and wherein the first and second actuating means comprise the same actuating means.

9. The controls bridge of claim 8, wherein the actuating means comprises:

a threaded sleeve which is rotatably connected to the second body portion; and a threaded receptacle which is fixed relative to the first body portion and which is adapted to threadedly engage the threaded sleeve;

wherein rotation of the threaded sleeve will move the second body portion relative to the first body portion and thereby bring the first and third coupling members into engagement with the second and fourth coupling members, respectively.

10. The controls bridge of claim 9, wherein the securing means comprises:

a plurality of collet fingers which are connected to the first body portion; and a wedge member which is connected to the second body portion;

wherein movement of the second body portion relative to the first body portion will bring the wedge ring into engagement with the collet fingers to trap the collet fingers in a corresponding groove that is formed in the tubing hanger or the tubing spool.

11. The controls bridge of claim 9, further comprising means for locking the second body portion to the first body portion.

12. The controls bridge of claim 11, wherein the locking means comprises the threaded sleeve and the threaded receptacle.

13. The controls bridge of claim 8, further comprising at least one closure member for controlling flow through the bridge line.

14. The controls bridge of claim 1, further comprising:

a second body portion which is removably connectable to the first body portion;

wherein the first coupling member is connected to the first body portion and the third coupling member is connected to the second body portion;

a fifth coupling member which is secured to the first body portion;

a passageway which connects the first coupling member to the fifth coupling member;

a sixth coupling member which is secured to the second body portion and which is adapted to engage the fifth coupling member when the second body portion is connected to the first body portion; and a conduit which connects the sixth coupling member to the third coupling member;

wherein the bridge line comprises the passageway and the conduit.

15. The controls bridge of claim 14, wherein the securing means comprises:

a collet sleeve which is movably connected to the first body portion and which includes a plurality of depending collet fingers;

a locking cam which is connected to the first body portion; and means for moving the locking cam relative to the collet fingers to thereby trap the collet fingers in a corresponding groove that is formed in the tubing hanger or the tubing spool.

16. The controls bridge of claim 15, wherein the moving means comprises:

a threaded shaft which is rotatably connected to the first body portion; and a threaded receptacle which is formed in the collet sleeve and which is adapted to threadedly receive the shaft;

wherein the locking cam is fixed relative to the first body portion; and wherein rotation of the shaft will move the locking cam relative to the collet sleeve and against the collet fingers.

17. The controls bridge of claim 14, wherein the first actuating means comprises:

a collet sleeve which is movably connected to the first body portion and which is fixed relative to the tubing hanger or the tubing spool when the first body portion is secured thereto; and means for moving the first body portion relative to the collet sleeve to thereby bring the first coupling member into engagement with the second coupling member.

18. The controls bridge of claim 17, wherein the moving means comprises:
- a threaded shaft which is rotatably connected to the first body portion; and
- a threaded receptacle which is formed in the collet sleeve and which is adapted to threadedly engage the shaft;
- wherein rotation of the shaft will move the first body portion relative to the collet sleeve.

19. The controls bridge of claim 14, wherein the second actuating means comprises:
- a lock sleeve which is movably connected to the second body portion and which is fixed relative to the first body portion when the second body portion is connected to the first body portion;
- means for moving the second body portion relative to the lock sleeve to thereby bring the third coupling member into engagement with the fourth coupling member.

20. The controls bridge of claim 19, wherein the moving means comprises:
- a threaded shaft which is rotatably connected to the second body portion; and
- a threaded receptacle which is formed in the lock sleeve and which is adapted to threadedly engage the shaft;
- wherein rotation of the shaft will move the second body portion relative to the lock sleeve.

21. The controls bridge of claim 14, further comprising means for locking the second body portion to the first body portion.

22. The controls bridge of claim 21, wherein the locking means comprises:
- a lock sleeve which is connected to the second body portion and which includes a number of depending locking fingers;
- a cam sleeve which is connected to the second body portion; and
- means for moving the cam sleeve relative to the lock sleeve to trap the locking fingers against a corresponding locking profile that is connected to the first body portion.

23. The controls bridge of claim 22, wherein the moving means comprises:
- a threaded shaft which is rotatably connected to the second body portion; and
- a threaded receptacle which is formed in the lock sleeve and which is adapted to threadedly engage the shaft;
- wherein rotation of the shaft will move the second body portion and the cam sleeve against the locking fingers.

24. The controls bridge of claim 14, further comprising at least one closure member for controlling flow through the bridge line.

25. The controls bridge of claim 1, wherein the service and controls conduit is an annulus bore and the external service and control line is connected to the production bore via the production outlet, whereby fluid circulation between the production bore and the annulus bore may be accomplished through the controls bridge.

26. The controls bridge of claim 1, wherein the service and controls conduit is an annulus bore and the external service and control line is an annulus vent line, whereby the tubing annulus may be vented through the controls bridge.

27. The controls bridge of any of claims 6, 13 or 24, wherein the closure member comprises a gate valve.

28. The controls bridge of claim 27, wherein the bridge line includes a first branch that extends generally laterally through the controls bridge and the gate valve comprises:
- a gate which is movably generally axially across the first branch and which includes a transverse hole; and
- an actuator for moving the gate between an open position in which the hole is aligned with the first branch and a closed position in which the hole is offset from the first branch.

29. The controls bridge of claim 28, wherein the actuator comprises:
- a valve stem which is connected to the gate and which is adapted to be pushed by an external device to thereby move the gate from the closed position to the open position; and
- a spring for moving the gate from the open position to the closed position in the absence of the external device.

30. The controls bridge of claim 27, wherein the bridge line includes a first branch that extends generally axially through the controls bridge and the gate valve comprises:
- a gate which is movably generally laterally across the first branch and which includes a transverse hole; and
- an actuator for moving the gate between an open position in which the hole is aligned with the first branch and a closed position in which the hole is offset from the first branch.

31. The controls bridge of claim 30, wherein the actuator comprises:
- a first piston which is positioned in a piston chamber that extends generally laterally through the controls bridge on a first lateral end of the gate;
- a second piston which is positioned in a second piston chamber that extends generally laterally through the controls bridge on a second lateral end of the gate;
- means for conveying pressurized fluid to the first piston chamber and the second piston chamber.

32. In combination with a flow completion system comprising a tubing spool having a production outlet, a tubing hanger having a production bore that communicates with the production outlet and at least one service and control conduit extending therethrough, and at least one external service and control line that terminates near the tubing spool, a controls bridge which comprises:
- a first body portion;
- means for securing the first body portion to the top of the tubing spool and/or the tubing hanger;
- at least one first coupling member which is adapted to engage a second coupling member that is mounted in the service and control conduit;
- at least one third coupling member which is adapted to engage a fourth coupling member that is connected to the external service and control line;
- a bridge line which is connected between the first coupling member and the third coupling member;
- a first actuating means for moving the first coupling member into engagement with the second coupling member;
- a second actuating means for moving the third coupling member into engagement with the fourth coupling member;
- wherein the first and second actuating means are selectively operable to connect the service and control conduit to the external service and control line through the coupling members and the bridge line.

33. The flow completion system of claim 32, wherein the first actuating means is connected to the second actuating means, whereby movement of the first and third coupling members is simultaneous.

34. The flow completion system of claim 32, wherein the first actuating means comprises:
- an actuating sleeve which includes a piston portion that is slidably received in a piston chamber that is connected to the first body portion; and
- an actuating flange which is movably connected to the first body portion;
- wherein the first coupling member is connected to the actuating flange; and
- wherein the application of pressure to the piston chamber will push the actuating sleeve against the actuating flange, which in turn will push the first coupling member into engagement with the second coupling member.

35. The flow completion system of claim 34, further comprising means for locking the first coupling member into engagement with the second coupling member.

36. The flow completion system of claim 35, wherein the locking means comprises:
- a lock ring which is slidably received on a cylindrical member that is fixed in position relative to the second coupling member when the first body portion is secured to the tubing spool and/or the tubing hanger; and
- a lock groove which is formed on the cylindrical member;
- wherein when the first coupling member is in engagement with the second coupling member, the actuating sleeve will trap the lock ring in the lock groove and against the actuating flange;
- whereby the lock ring will prevent the actuating flange from moving relative to the cylindrical member in a direction away from the second coupling member.

37. The flow completion system of claim 32, further comprising at least one closure member for controlling flow through the bridge line.

38. The flow completion system of claim 32, wherein the securing means comprises:
- a plurality of collet fingers which are connected to the first body portion;
- an actuating sleeve which includes a piston portion that is slidably received in a piston chamber that is connected to the first body portion; and
- an actuating flange which is movably connected to the first body portion;
- wherein the application of pressure to the piston chamber will push the actuating sleeve against the actuating flange, which in turn will trap the collet fingers in a corresponding groove that is formed in the tubing hanger or the tubing spool.

39. The flow completion system of claim 32, further comprising:
- a second body portion which is movably connected to the first body portion;
- wherein the first and third coupling members are connected to the second body portion; and
- wherein the first and second actuating means comprise the same actuating means.

40. The flow completion system of claim 39, wherein the actuating means comprises:
- a threaded sleeve which is rotatably connected to the second body portion; and
- a threaded receptacle which is fixed relative to the first body portion and which is adapted to threadedly engage the threaded sleeve;
- wherein rotation of the threaded sleeve will move the second body portion relative to the first body portion and thereby bring the first and third coupling members into engagement with the second and fourth coupling members, respectively.

41. The flow completion system of claim 40, wherein the securing means comprises:
- a plurality of collet fingers which are connected to the first body portion; and
- a wedge member which is connected to the second body portion;
- wherein movement of the second body portion relative to the first body portion will bring the wedge ring into engagement with the collet fingers to trap the collet fingers in a corresponding groove that is formed in the tubing hanger or the tubing spool.

42. The flow completion system of claim 40, further comprising means for locking the second body portion to the first body portion.

43. The flow completion system of claim 42, wherein the locking means comprises the threaded sleeve and the threaded receptacle.

44. The flow completion system of claim 39, further comprising at least one closure member for controlling flow through the bridge line.

45. The flow completion system of claim 32, further comprising:
- a second body portion which is removably connectable to the first body portion;
- wherein the first coupling member is connected to the first body portion and the third coupling member is connected to the second body portion;
- a fifth coupling member which is secured to the first body portion;
- a passageway which connects the first coupling member to the fifth coupling member;
- a sixth coupling member which is secured to the second body portion and which is adapted to engage the fifth coupling member when the second body portion is connected to the first body portion; and
- a conduit which connects the sixth coupling member to the third coupling member;
- wherein the bridge line comprises the passageway and the conduit.

46. The flow completion system of claim 45, wherein the securing means comprises:
- a collet sleeve which is movably connected to the first body portion and which includes a plurality of depending collet fingers;
- a locking cam which is connected to the first body portion; and
- means for moving the locking cam relative to the collet fingers to thereby trap the collet fingers in a corresponding groove that is formed in the tubing hanger or the tubing spool.

47. The flow completion system of claim 46, wherein the moving means comprises:
- a threaded shaft which is rotatably connected to the first body portion; and
- a threaded receptacle which is formed in the collet sleeve and which is adapted to threadedly receive the shaft;
- wherein the locking cam is fixed relative to the first body portion; and
- wherein rotation of the shaft will move the locking cam relative to the collet sleeve and against the collet fingers.

48. The flow completion system of claim 45, wherein the first actuating means comprises:
- a collet sleeve which is movably connected to the first body portion and which is fixed relative to the tubing hanger or the tubing spool when the first body portion is secured thereto; and
- means for moving the first body portion relative to the collet sleeve to thereby bring the first coupling member into engagement with the second coupling member.

49. The flow completion system of claim 48, wherein the moving means comprises:
- a threaded shaft which is rotatably connected to the first body portion; and
- a threaded receptacle which is formed in the collet sleeve and which is adapted to threadedly engage the shaft;
- wherein rotation of the shaft will move the first body portion relative to the collet sleeve.

50. The flow completion system of claim 45, wherein the second actuating means comprises:
- a lock sleeve which is movably connected to the second body portion and which is fixed relative to the first body portion when the second body portion is connected to the first body portion;
- means for moving the second body portion relative to the lock sleeve to thereby bring the third coupling member into engagement with the fourth coupling member.

51. The flow completion system of claim 50, wherein the moving means comprises:
- a threaded shaft which is rotatably connected to the second body portion; and
- a threaded receptacle which is formed in the lock sleeve and which is adapted to threadedly engage the shaft;
- wherein rotation of the shaft will move the second body portion relative to the lock sleeve.

52. The flow completion system of claim 45, further comprising means for locking the second body portion to the first body portion.

53. The flow completion system of claim 52, wherein the locking means comprises:
- a lock sleeve which is connected to the second body portion and which includes a number of depending locking fingers;
- a cam sleeve which is connected to the second body portion; and
- means for moving the cam sleeve relative to the lock sleeve to trap the locking fingers against a corresponding locking profile that is connected to the first body portion.

54. The flow completion system of claim 53, wherein the moving means comprises:
- a threaded shaft which is rotatably connected to the second body portion; and
- a threaded receptacle which is formed in the lock sleeve and which is adapted to threadedly engage the shaft;
- wherein rotation of the shaft will move the second body portion and the cam sleeve against the locking fingers.

55. The flow completion system of claim 45, further comprising at least one closure member for controlling flow through the bridge line.

56. The flow completion system of claim 32, wherein the service and controls conduit is an annulus bore and the external service and control line is connected to the production bore via the production outlet, whereby fluid circulation between the production bore and the annulus bore may be accomplished through the controls bridge.

57. The flow completion system of claim 32, wherein the service and controls conduit is an annulus bore and the external service and control line is an annulus vent line, whereby the tubing annulus may be vented through the controls bridge.

58. The flow completion system of any of claims 37, 44 and 55, wherein the closure member comprises a gate valve.

59. The flow completion system of claim 58, wherein the bridge line includes a first branch that extends generally laterally through the controls bridge and the gate valve comprises:
- a gate which is movably generally axially across the first branch and which includes a transverse hole; and
- an actuator for moving the gate between an open position in which the hole is aligned with the first branch and a closed position in which the hole is offset from the first branch.

60. The flow completion system of claim 59, wherein the actuator comprises:
- a valve stem which is connected to the gate and which is adapted to be pushed by an external device to thereby move the gate from the closed position to the open position; and
- a spring for moving the gate from the open position to the closed position in the absence of the external device.

61. The flow completion system of claim 58, wherein the bridge line includes a first branch that extends generally axially through the controls bridge and the gate valve comprises:
- a gate which is movably generally laterally across the first branch and which includes a transverse hole; and
- an actuator for moving the gate between an open position in which the hole is aligned with the first branch and a closed position in which the hole is offset from the first branch.

62. The flow completion system of claim 61, wherein the actuator comprises:
- a first piston which is positioned in a piston chamber that extends generally laterally through the controls bridge on a first lateral end of the gate;
- a second piston which is positioned in a second piston chamber that extends generally laterally through the controls bridge on a second lateral end of the gate;
- means for conveying pressurized fluid to the first piston chamber and the second piston chamber.

* * * * *